United States Patent
Gundeti et al.

(10) Patent No.: US 12,412,582 B2
(45) Date of Patent: Sep. 9, 2025

(54) CONTACT LIST RECONCILIATION AND PERMISSIONING

(71) Applicant: Amazon Technologies, Inc., Seattle, WA (US)

(72) Inventors: Vikram Kumar Gundeti, Bellevue, WA (US); Mohammed Yasar Arafatha Abdul Rahim, Chennai (IN)

(73) Assignee: Amazon Technologies, Inc., Seattle, WA (US)

( * ) Notice: Subject to any disclaimer, the term of this patent is extended or adjusted under 35 U.S.C. 154(b) by 171 days.

(21) Appl. No.: 18/508,667

(22) Filed: Nov. 14, 2023

(65) Prior Publication Data

US 2024/0135932 A1    Apr. 25, 2024

Related U.S. Application Data

(63) Continuation of application No. 17/030,459, filed on Sep. 24, 2020, now Pat. No. 11,854,552, which is a continuation of application No. 16/021,518, filed on Jun. 28, 2018, now Pat. No. 10,811,014.

(51) Int. Cl.
| | |
|---|---|
| *G10L 15/26* | (2006.01) |
| *H04M 1/27453* | (2020.01) |
| *H04M 1/2757* | (2020.01) |
| *H04M 3/00* | (2024.01) |
| *H04M 3/44* | (2006.01) |
| *H04M 1/27457* | (2020.01) |

(52) U.S. Cl.
CPC ......... *G10L 15/26* (2013.01); *H04M 1/27453* (2020.01); *H04M 1/2757* (2020.01); *H04M 3/007* (2013.01); *H04M 3/44* (2013.01); *H04M 1/27457* (2020.01); *H04M 2201/22* (2013.01)

(58) Field of Classification Search
CPC . G10L 15/26; H04M 1/27453; H04M 1/2757; H04M 3/007; H04M 3/44; H04M 1/27457; H04M 2201/22
USPC .......................................................... 704/275
See application file for complete search history.

(56) References Cited

U.S. PATENT DOCUMENTS

| | | | |
|---|---|---|---|
| 8,218,752 B1 * | 7/2012 | Kirkpatrick | H04M 3/436 379/249 |
| 8,964,965 B1 * | 2/2015 | Kunins | H04M 1/2757 455/415 |
| 10,127,220 B2 * | 11/2018 | Bellegarda | G06F 40/30 |
| 10,298,685 B1 * | 5/2019 | Amansahedov | H04M 1/2757 |
| 10,395,654 B2 * | 8/2019 | Golipour | G10L 15/22 |

(Continued)

*Primary Examiner* — Edwin S Leland, III
(74) *Attorney, Agent, or Firm* — Pierce Atwood LLP

(57) ABSTRACT

Techniques for using validated communications identifiers of a user's communications profile to resolve entries in another user's contact list are described. When a user imports a contact list, the contact list may include multiple entities related to the same person. The system may identify one of the entries in the contact list that corresponds to a validated communications identifier stored in another user's communications profile. The system may identify other validated communications identifiers in the other user's communications profile and cross-reference them against the entries of the contact list. If the system determines the contact list includes entries for the different validated communications identifiers of the other user, the system may consolidate the entries into a single entry associated with the other user.

20 Claims, 19 Drawing Sheets

(56) References Cited

U.S. PATENT DOCUMENTS

| | | | | |
|---|---|---|---|---|
| 10,445,429 B2* | 10/2019 | Seyed Ibrahim | ..... | G06F 40/205 |
| 10,446,143 B2* | 10/2019 | Akbacak | ............... | G06F 40/166 |
| 10,462,637 B1* | 10/2019 | Lifschultz | ............... | H04L 67/30 |
| 10,496,705 B1* | 12/2019 | Irani | ................. | G06F 16/90328 |
| 10,536,414 B2* | 1/2020 | Dye | ....................... | G06F 3/0482 |
| 10,811,014 B1* | 10/2020 | Gundeti | ............ | H04M 1/27453 |
| 11,368,576 B2* | 6/2022 | Auffret | ............ | H04M 3/42042 |
| 2006/0035632 A1* | 2/2006 | Sorvari | ............... | H04M 1/7243 |
| | | | | 455/418 |
| 2007/0041571 A1* | 2/2007 | Chatterjee | ............ | H04L 67/535 |
| | | | | 379/218.01 |
| 2008/0168396 A1* | 7/2008 | Matas | ................ | G01C 21/3667 |
| | | | | 715/840 |
| 2008/0186226 A1* | 8/2008 | Ratnakar | ........... | H04M 1/72457 |
| | | | | 342/357.74 |
| 2009/0093242 A1* | 4/2009 | Bhalekar | ........... | H04M 1/72436 |
| | | | | 455/418 |
| 2010/0203874 A1* | 8/2010 | Scott | ....................... | H04M 1/56 |
| | | | | 455/566 |
| 2011/0201320 A1* | 8/2011 | Wosk | ................. | H04M 3/42042 |
| | | | | 455/415 |
| 2012/0078971 A1* | 3/2012 | Ma | ..................... | H04M 1/27453 |
| | | | | 707/802 |
| 2016/0065525 A1* | 3/2016 | Dye | ........................ | G06F 3/041 |
| | | | | 715/752 |
| 2016/0260433 A1* | 9/2016 | Sumner | ................... | G06F 40/30 |
| 2016/0260436 A1* | 9/2016 | Lemay | .................... | G10L 15/28 |
| 2017/0132019 A1* | 5/2017 | Karashchuk | ........... | G06F 9/453 |
| 2017/0185375 A1* | 6/2017 | Martel | ..................... | G06F 3/165 |
| 2017/0358300 A1* | 12/2017 | Laurens | .................. | G06F 3/167 |
| 2017/0359707 A1* | 12/2017 | Diaconu | ............. | H04W 4/16 |
| 2018/0060017 A1* | 3/2018 | Lauck | ................. | H04M 1/274 |
| 2018/0196683 A1* | 7/2018 | Radebaugh | ........... | G06F 16/245 |
| 2018/0330731 A1* | 11/2018 | Zeitlin | ................ | G10L 15/1815 |
| 2018/0336197 A1* | 11/2018 | Skilling | .................. | G10L 15/10 |
| 2018/0336905 A1* | 11/2018 | Kim | ........................ | G10L 15/16 |
| 2019/0164546 A1* | 5/2019 | Piernot | .................. | G10L 15/22 |
| 2019/0220246 A1* | 7/2019 | Orr | ........................ | G06F 40/279 |
| 2019/0278841 A1* | 9/2019 | Pusateri | ................ | G10L 15/26 |
| 2019/0295544 A1* | 9/2019 | Garcia | ................. | G10L 15/22 |
| 2021/0142804 A1* | 5/2021 | Gundeti | ............... | G10L 15/26 |
| 2023/0011805 A1* | 1/2023 | Galchenko | ..... | G06Q 10/063112 |

* cited by examiner

FIG. 4

| Entry Name | Contact Identifier | Entry Content |
|---|---|---|
| John | 1234 | 555-555-5555 |
| John's email | 2345 | john@ABCXYZ.com |
| John Smith | 3456 | 234567 |
| [Empty] | 4567 | JohnSmith123 |
| Social Media | 5678 | John Smith |

User 12345 Communications Contact List

FIG. 6A

John Smith's Communications Profile
(Communications Profile Identifier 8675309)
- System communications identifier
- Phone number
- Internet-based communications system
  - Identifier
- Messaging application
  - Identifier
- Social media
  - Identifier
- E-mail
  - Identifier

| Entry Name | Contact Identifier | Entry Content |
|---|---|---|
| John | 1234 | 555-555-5555 |
| John's email | 2345 | john@ABCXYZ.com |
| John Smith | 3456 | 234567 |
| [Empty] | 4567 | JohnSmith123 |
| Social Media | 5678 | John Smith |

User 12345 Communications Contact List

CONTACT LIST RECONCILIATION AND PERMISSIONING

CROSS-REFERENCE TO RELATED APPLICATION

This application is a continuation of, and claims the benefit of priority of, U.S. Non-provisional patent application Ser. No. 17/030,459, filed on Sep. 24, 2020, and entitled "CONTACT LIST RECONCILIATION AND PERMISSIONING", which is a continuation of U.S. Non-provisional patent application Ser. No. 16/021,518, filed on Jun. 28, 2018, and entitled "CONTACT LIST RECONCILIATION AND PERMISSIONING," now issued patent U.S. Pat. No. 10,811,014, the contents of which is expressly incorporated herein by reference in its entirety.

BACKGROUND

Speech recognition systems have progressed to the point where humans can interact with computing devices using their voices. Such systems employ techniques to identify the words spoken by a human user based on the various qualities of a received audio input. Speech recognition processing combined with natural language understanding processing enable speech-based user control of computing devices to perform tasks based on the user's spoken commands. The combination of speech recognition processing and natural language understanding processing techniques is referred to herein as speech processing. Speech processing may also involve converting a user's speech into text data which may then be provided to speechlets.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 4 is a conceptual diagram of a user's communications contact list entries associated with a single individual according to embodiments of the present disclosure.

FIG. 6A is a conceptual diagram of how a user's communications profile may be used to identify various entries of a contact list related to the user according to embodiments of the present disclosure.

DETAILED DESCRIPTION

Figure 1:
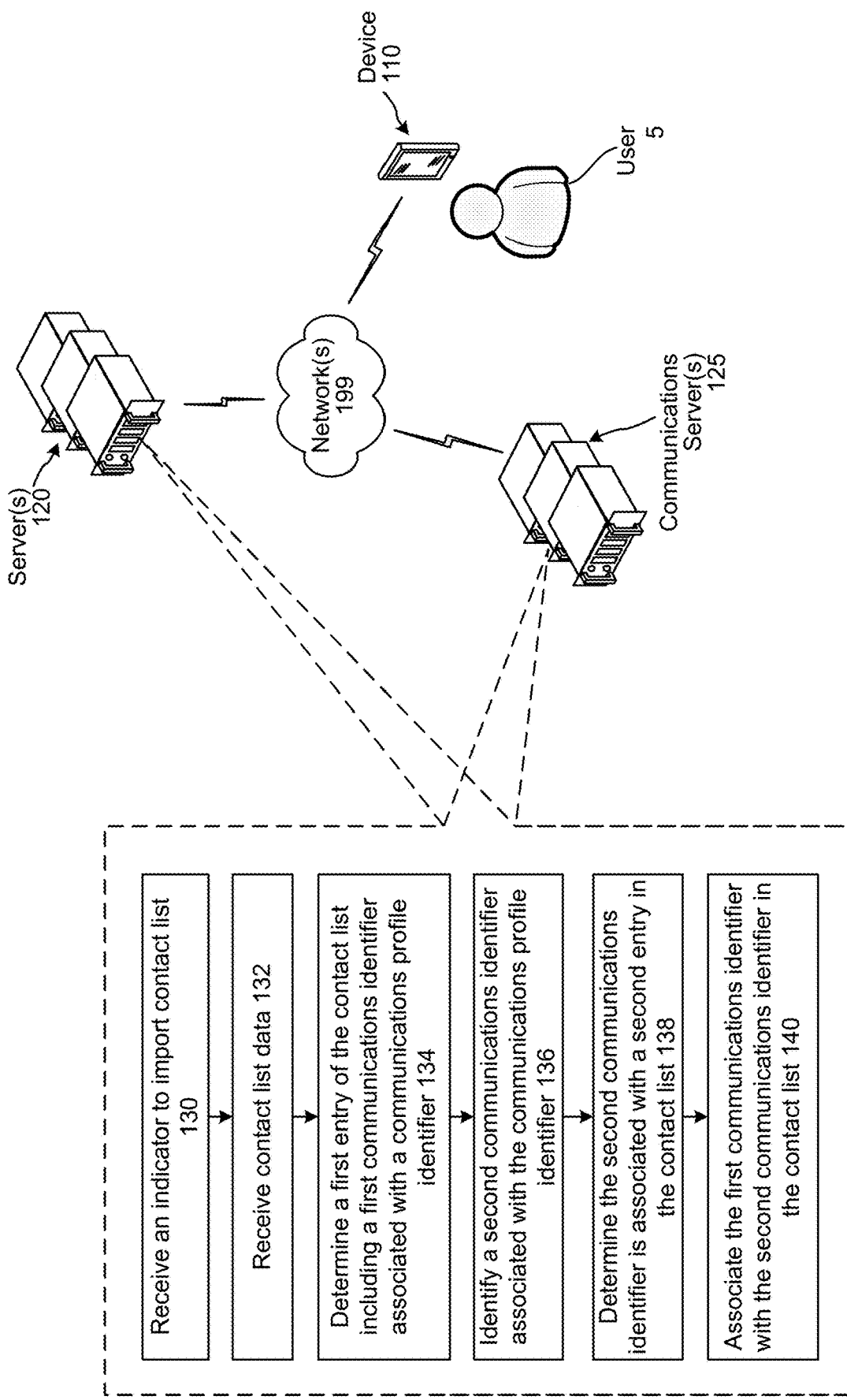
FIG. 1 is a conceptual diagram of a system configured to reconcile entries of a contact list according to embodiments of the present disclosure.

Automatic speech recognition (ASR) is a field of computer science, artificial intelligence, and linguistics concerned with transforming audio data representing speech into text data representative of that speech. Natural language understanding (NLU) is a field of computer science, artificial intelligence, and linguistics concerned with enabling computers to derive meaning from text data containing natural language. Text-to-speech (TTS) is a field of computer science, artificial intelligence, and linguistics concerned with enabling computers to output synthesized speech. ASR, NLU, and TTS may be used together as part of a speech processing system.

Certain systems may perform actions in response to user inputs, which may originate as user speech. For example, a system may output weather information in response to a user input corresponding to "Alexa, what is the weather today." For further example, a system may play Adele music in response to a user input corresponding to "Alexa, play Adele music." In another example, a system may book a ride with a ride sharing service in response to a user input corresponding to "Alexa, book me a ride to the airport."

Certain systems may include communications functionality that enable users to send messages to other users as well as perform calls with other users. For example, if a user speaks "Alexa, tell John I am on my way" to a system device, the system may send a message to "John" with the message's content corresponding to audio of "I am on my way" and/or a text transcription thereof. For further example, if a user says "Alexa, call John" to a system device, the system may establish a two-way communication session between the system device and a device associated with "John."

In order to send messages to other users or call other users, a user of the system may create a profile with the system and import one or more contact lists to the profile. For example, when a user signs up for communications functionality of the system, the user may provide the system with permission to import their contacts from their personal device (e.g., a smart phone). At some point, the user may also validate their email address, social media handle, or some other communications identifier with the system.

The present disclosure leverages the validated communications identifiers of a user's profile to resolve entries in another user's contact list. The system may be configured to perform the teachings of the present disclosure only if user permission has been obtained.

When a user imports a contact list to their profile, the contact list may include multiple entries related to the same person. For example, a single person may be associated with an email entry and a phone number entry in the contact list.

The system may identify one of the entries in the contact list that corresponds to a validated communications identifier stored in another user's profile. The system may identify other validated communications identifiers in the other user's profile and cross-reference them against the entries of the contact list. If the system determines the contact list includes entries for the different validated communications identifiers of the other user, the system may consolidate the entries into a single entry associated with the other user.

The present disclosure also enables a first user to block various communications modalities of a second user even if the first user does not know of all the communications modalities. For example, the first user may only know and block a first communications identifier of the second user. When the first user blocks the first communications identifier, the system may implement the block at the profile level of the second user. As a result, if the second user later tries to communicate with the first user using a second communications modality validated with the system, the system will prevent the communication from occurring.

Other advantages of the present disclosure will become apparent in view of the below description.

As used herein, a communications modality may be associated with a particular system's application program interfaces (APIs), protocols, etc. Each communications modality may be associated with a different skill, communications/messaging protocols, encryption techniques (or lack thereof), etc. A particular modality may be capable of communicating using one or more different mediums. For example, one modality, such as an application (e.g., Skype, Facebook, or the like) may allow a user to engage in different types of communications (e.g., text messages, video calls, etc.) using the particular application. A user may have a particular identity/identifier associated with one particular modality and another identity/identifier associated with a different modality. For example, a user's Skype identifier may be JohnSmith12345 while the same user's Facebook identifier may be JohnRSmith.

FIG. 1 illustrates a system configured to reconcile entries of a contact list. Although the figures and discussion of the present disclosure illustrate certain operational steps of the system in a particular order, the steps described may be performed in a different order (as well as certain steps removed or added) without departing from the intent of the disclosure. A device 110 local to a user 5, one or more servers 120, and one or more communications servers 125 may communicate across one or more networks 199. One skilled in the art will appreciate that a user of the disclosed system may be a human, business entity, computing device, or component of a computing device.

The below description describes the steps of FIG. 1 being performed by the server(s) 120. One skilled in the art will appreciate that the communications server(s) 125 may perform some or all of the steps described with respect to FIG. 1 without departing from the present disclosure.

The server(s) 120 receives (130) an indicator to import a contact list. The indicator may be audio data representing speech of the user 5. The audio data may be sent to the server(s) 120 by the device 110. Alternatively, the indicator may be non-audio data generated in response to the user's activation of a virtual button displayed by the device 110.

The server(s) 120 receives (132) contact list data representing the contact list. The server(s) 120 may receive the contact list data from the device 110 from which the indicator was received. For example, the device 110 may be a smart phone and the contact list data may represent the contact list stored by the smart phone. The server(s) 120 may pull the contact list data or the contact list data may be pushed to the server(s) 120.

The server(s) 120 determines (134) a first entry (associated with a first contact identifier) of the contact list including a first communications identifier associated with a communications profile identifier of a user different from the user 5. The first communications identifier may be an email address, phone number, social media handle, or some other communications identifier.

The server(s) 120 identifies (136) a second communications identifier is associated with the communications profile identifier. For example, if the first communications identifier is a phone number of the other user, the second communications identifier may be an email address of the other user.

The server(s) 120 determines (138) the second communications identifier is associated with a second entry (associated with a second contact identifier) in the contact list and associates (140) the first communications identifier with the second communications identifier in the contact list. For example, the server(s) 120 may create an association between the first contact identifier of the first entry and the second contact identifier of the second entry. For further example, the server(s) 120 may create a new entry (associated with a new contact identifier) including the first communications identifier and the second communications identifier, and may delete the first and second entries from the contact list. The manner in which the server(s) 120 associates the first and second communications identifiers may be based on user preference.

Figure 2:
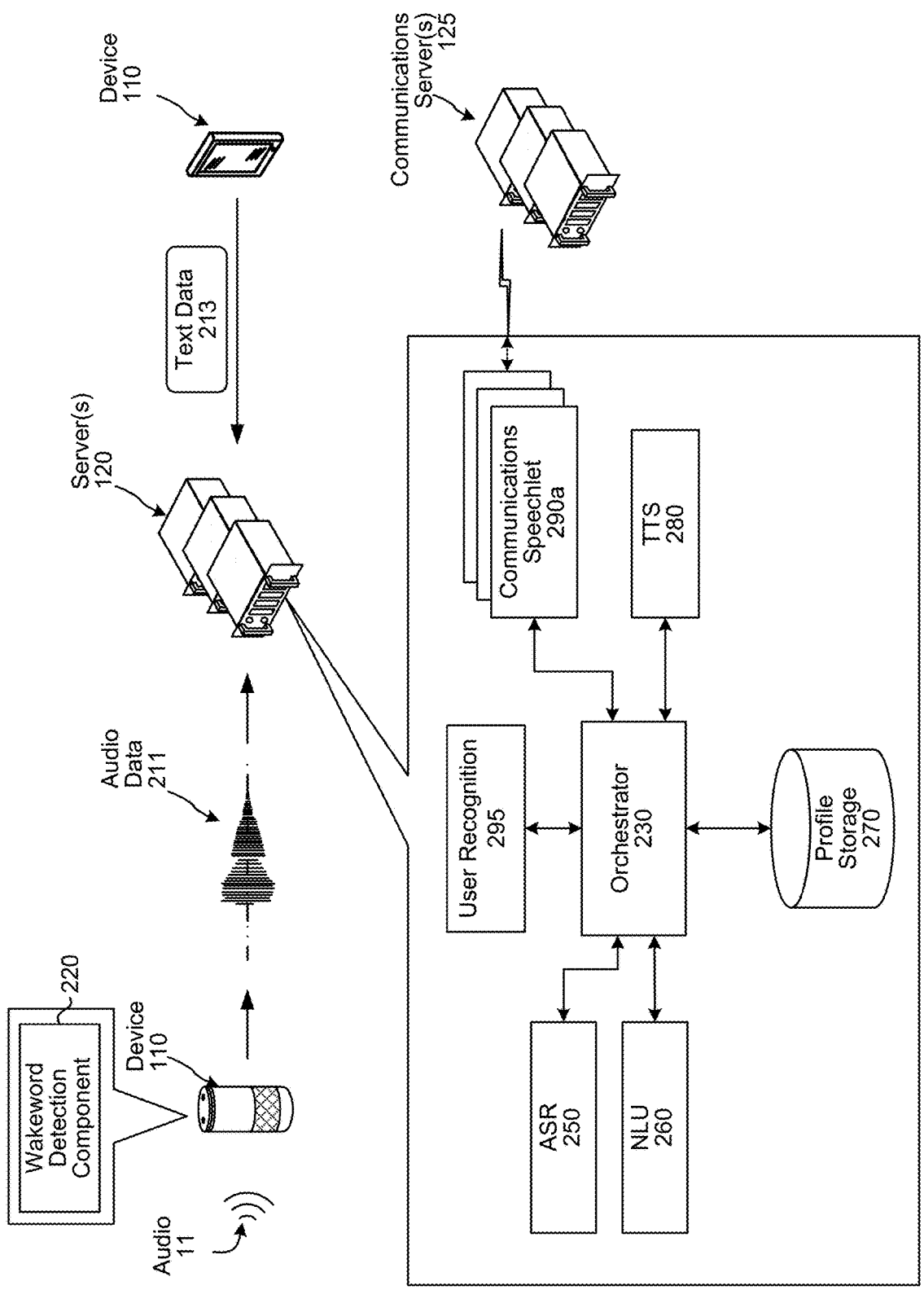
FIG. 2 is a conceptual diagram of components of a system according to embodiments of the present disclosure.

The system may operate using various components as described in FIG. 2. The various components may be located on same or different physical devices. Communication between various components may occur directly or across a network(s) 199.

An audio capture component(s), such as a microphone or array of microphones of the device 110, captures audio 11. The device 110 processes audio data, representing the audio 11, to determine whether speech is detected. The device 110 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. This process may also be referred to as keyword detection, with a wakeword being a specific example of a keyword. An example wakeword is "Alexa."

Wakeword detection is typically performed without performing linguistic analysis, textual analysis, or semantic analysis. Instead, the audio data representing the audio 11 is analyzed to determine if specific characteristics of the audio data match preconfigured acoustic waveforms, audio signatures, or other data to determine if the audio data "matches" stored audio data corresponding to a wakeword.

The wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the server(s) 120. The audio data 211 may include data corresponding to the wakeword, or the portion of the audio data 211 corresponding to the wakeword may be removed by the device 110 prior to sending the audio data 211 to the server(s) 120.

Upon receipt by the server(s) 120, the audio data 211 may be sent to an orchestrator component 230. The orchestrator component 230 may include memory and logic that enable the orchestrator component 230 to transmit various pieces and forms of data to various components of the system, as well as perform other operations.

The orchestrator component 230 sends the audio data 211 to an ASR component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, for example via the orchestrator component 230. The text data sent from the ASR component 250 to the NLU component 260 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

Above is described pre-NLU processing with respect to a spoken user input. A user may alternatively provide a text input to the device 110, for example using a virtual keyboard. The device 110 may generate text data 213 representing the text input and send the text data 213 to the server(s) 120. Upon receipt by the server(s) 120, the text data 213 may be sent to the orchestrator component 230. The orchestrator component 330 may send the text data 213 to the NLU component 260.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent representing an action that a user desires be performed as well as pieces of the input text data that allow a device (e.g., the device 110, the server(s) 120, the communications server(s) 125, etc.) to execute the intent. For example, if the text data corresponds to "call John," the NLU component 260 may determine an intent that the system establish a two-way communication channel between the device 110 originating the call and a device of the recipient "John." For further example, if the text data corresponds to "tell John I am on my way," the NLU component 260 may determine an intent that the system send a message to a device of the recipient "John," with the message corresponding to "I am on my way."

The NLU component 260 outputs NLU results to the orchestrator component 230. The NLU results may include an NLU hypothesis, including a representation of an intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value.

The orchestrator component 230 may send the NLU results to an associated speechlet component 290. If the NLU results include multiple NLU hypotheses, the orchestrator component 230 may send a portion of the NLU results corresponding to the top scoring NLU hypothesis to a speechlet component 290 associated with the top scoring NLU hypothesis.

A "speechlet" or "speechlet component" may be software running on the server(s) 120 that is akin to a software application running on a traditional computing device. That is, a speechlet component 290 may enable the server(s) 120 to execute specific functionality in order to perform one or more actions (e.g., provide information to a user, display content to a user, output music, or perform some other requested action). The server(s) 120 may be configured with more than one speechlet component 290. For example, a weather speechlet component may enable the server(s) 120 to provide weather information, a ride sharing speechlet component may enable the server(s) 120 to schedule a trip with respect to a ride sharing service, a restaurant speechlet component may enable the server(s) 120 to order food with respect to a restaurant's online ordering system, a communications speechlet component may enable the system to perform messaging or multi-endpoint communications, etc. A speechlet component 290 may operate in conjunction between the server(s) 120 and other devices such as the device 110 or a communications server(s) 125 in order to complete certain functions. Inputs to a speechlet component 290 may come from various interactions and input sources.

The functionality described herein as a speechlet or speechlet component may be referred to using many different terms, such as an action, bot, app, or the like.

A speechlet component 290 may include hardware, software, firmware, or the like that may be dedicated to the particular speechlet component 290 or shared among different speechlet components 290. A speechlet component 290 may be part of the server(s) 120 (as illustrated in FIG. 2) or may be located at whole (or in part) with one or more separate servers. Unless expressly stated otherwise, reference to a speechlet, speechlet device, or speechlet component may include a speechlet component operating within the server(s) 120 (for example as speechlet component 290) and/or speechlet component operating within a server(s) separate from the server(s) 120.

A speechlet component 290 may be configured to perform one or more actions. An ability to perform such action(s) may sometimes be referred to as a "skill." A skill may enable a speechlet component 290 to execute specific functionality in order to provide data or produce some other output requested by a user. A particular speechlet component 290 may be configured to execute more than one skill. For example, a weather skill may involve a weather speechlet component providing weather information to the server(s) 120, a ride sharing skill may involve a ride sharing speechlet component scheduling a trip with respect to a ride sharing service, an order pizza skill may involve a restaurant speechlet component ordering pizza with respect to a restaurant's online ordering system, etc.

A speechlet component 290 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, gaming skills, as well as custom skills that are not associated with any pre-configured type of skill.

The server(s) 120 may include a TTS component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The server(s) 120 may include profile storage 270. The profile storage 270 may include a variety of information related to individual users, groups of users, etc. that interact with the system.

The profile storage 270 may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the component(s) of the system(s) and/or user are located.

The server(s) 120 may include a user recognition component 295 that recognizes one or more users associated with data input to the system. The user recognition component 295 may take as input the audio data 211 and/or text data output by the ASR component 250. The user recognition component 295 determines scores indicating whether user input originated from a particular user. For example, a first score may indicate a likelihood that the user input originated from a first user, a second score may indicate a likelihood that the user input originated from a second user, etc. The user recognition component 295 also determines an overall confidence regarding the accuracy of user recognition operations. The user recognition component 295 may perform user recognition by comparing audio characteristics in the audio data 211 to stored audio characteristics of users. The user recognition component 295 may also perform user recognition by comparing biometric data (e.g., fingerprint data, iris data, etc.), received by the system in correlation with the present user input, to stored biometric data of users. The user recognition component 295 may further perform user recognition by comparing image data (e.g., including a representation of at least a feature of a user), received by the system in correlation with the present user input, with stored image data including representations of features of different users. The user recognition component 295 may perform additional user recognition processes, including those known in the art. Output of the user recognition component 295 may include a single user identifier corresponding to the most likely user that originated the present user input. Alternatively, output of the user recognition component 295 may include an N-best list of user identifiers with respective scores indicating likelihoods of respective users originating the present user input. The output of the user recognition component 295 may be used to inform NLU processing as well as processing performed by other components of the system.

Figure 3:
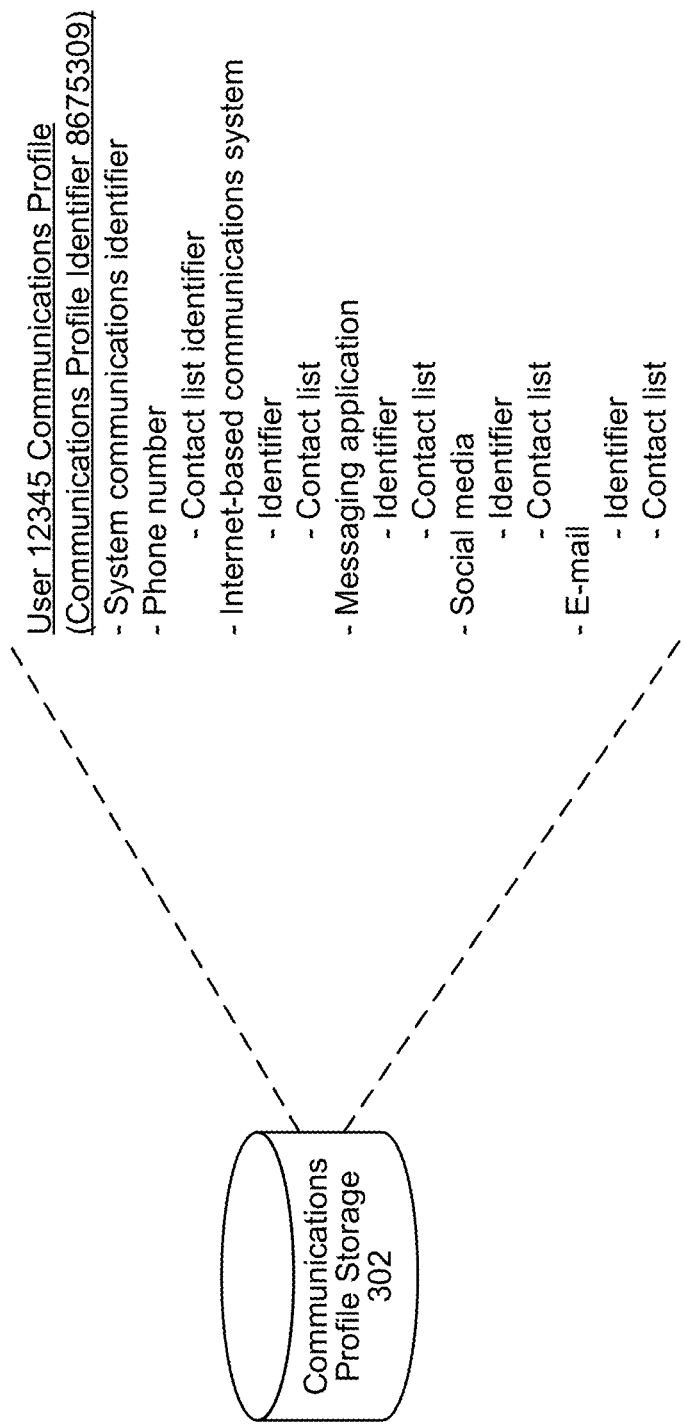
FIG. 3 is a conceptual diagram of a user's communications profile according to embodiments of the present disclosure.

FIG. 3 illustrates an example communications profile of a user stored in a communications profile storage 302. The communications profile storage 302 may be implemented as part of the communications server(s) 125 or the server(s) 120.

When a user enables or signs up for communications functionality of the system, the system may generate a communications profile identifier specific to the user. The user may validate their phone number with the system. For example, the user may input their phone number to the system. The system may then validate the phone number with a cellular service provider. Once validated, the system may store the phone number in the user's communications profile (e.g., the system may associate the user's phone number with the user's communications profile identifier).

The system may output a prompt to the user. The prompt may be displayed on a screen of the device 110 as text and/or output as audio by the device 110. The prompt may ask whether the user wants to import their contact list (e.g., a contact list stored on the device 110) to the system. If the user responds affirmatively, the system may import the contact list to the user's communication's profile in the communications profile storage 302 (e.g., the system may associate the user's contact list with the user's communications profile identifier). Alternatively, the system may import the contact list to a different storage (implemented as part of the communications server(s) 125 or the server(s) 120), and associate the stored contact list with the user's communications profile identifier via a contact list identifier.

The user may also validate various communications identifiers with the system. The various communications identifiers may correspond to different modalities of communications. Moreover, the communications identifiers may be associated with different communications systems. The system may validate and store the communications identifiers in the user's communications profile (e.g., may associate each of the user's validated communications identifiers with the user's communications profile identifier). For example, the user may send messages and/or perform calls via the internet using an internet-based communications system. For further example, the user may send messages via a messaging application downloaded on the device 110. The user may provide the system with their communications identifier of a communications system (different from the communications system described herein), the system of the present disclosure may validate the user's communications identifier with the communications system, and may thereafter store the user's communications identifier in the user's communications profile (e.g., associate the validated communications identifier with the user's communications profile identifier), along with a representation of the communications system associated with the communications identifier. For example, as illustrated in FIG. 3, the user may validate an internet-based communications identifier and a messaging application identifier.

As illustrated in FIG. 3, a user's communications profile identifier may be associated with various communications identifiers of the user. When the user provides the system with a communications identifier to validate, the user may also provide the system with permission to import a contact list associated with the user's communications identifier. The user may perform communications using various communications sources. Each communications source may store a respective contact list for the user. The user's communication profile identifier may be associated with the contact lists of each communications source the user permitted to be imported. As illustrated in FIG. 3, each contact list may be associated with the communications source from which it was imported. Alternatively, the system may be configured to conglomerate all of the user's imported contact lists into a single contact list associated with the user's communications profile identifier.

The contact lists of a user from different communications sources may include entries that relate to the same individual. FIG. 4 illustrates a user's communications contact list entries associated with a single individual. Each entry in a contact list may be associated with a different contact identifier.

An individual may communicate with others using various communications sources and modalities. Each communications source may assign the individual a specific communications identifier, such as an email address, phone number, social media handle, etc. When a user of the system causes the system to import contacts lists from various communications sources, the conglomerate contact list associated with the user's system communications profile may include various entries related to communications identifiers of the same individual. FIG. 4 illustrates entries in a user's contact list that are associated with the same individual. While the user may know each of these entries relate to the same individual, the system may not know the entries relate to the same individual when the different contact lists are imported and conglomerated.

When a user enables or signs up for communications functionality of the system (or sometime thereafter), a user may validate communications identifiers of different communications sources with the system. As a result, the user's communications profile identifier may be associated with various communications identifiers of the user.

Figure 5:
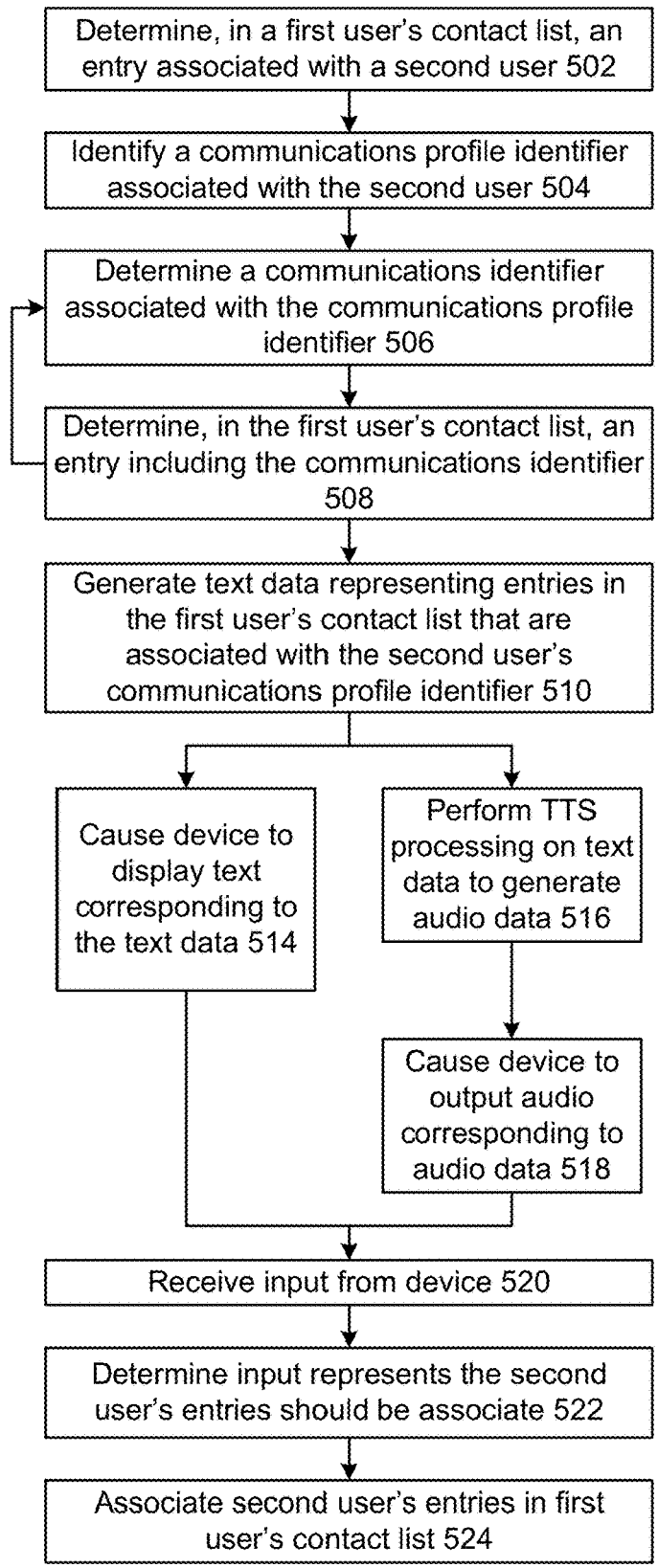
FIG. 5 is a process flow diagram illustrating how a system associates various entries of a contact list related to a single user according to embodiments of the present disclosure.

FIG. 5 illustrates how the system may associate various entries, related to a single user, of a contact list using the user's communications profile. The system determines (502), in a first user's contact list, an entry associated with a second user and identifies (504) a communications profile identifier associated with the second user. For example, the system may determine an entry including a communications identifier (e.g., a phone number or some other communications modality identifier) and may determine a communications profile identifier associated with the communications identifier.

Figure 6B:
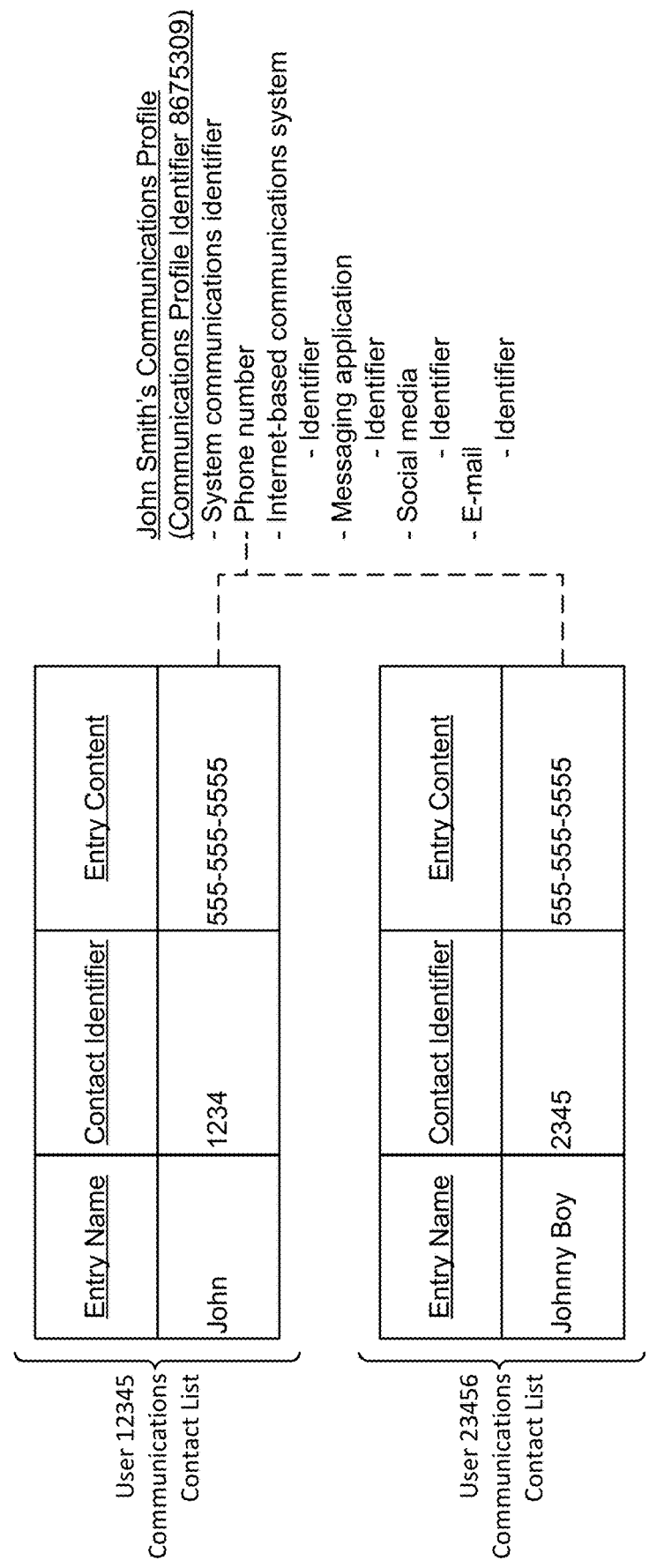
FIG. 6B is a conceptual diagram of how entries of more than one contact list may be associated with a user's communications profile according to embodiments of the present disclosure.

The system determines (506) a second communications identifier associated with the second user's communications profile identifier. For example, if the communications identifier used to determine the second user's communications profile identifier was a phone number, the second communications identifier may be an email address or some other communications modality identifier. The system determines (508), in the first user's contact list, an entry including the second communications identifier. The system may repeat steps 506 and 508 with respect to a first user's contact list and a second user's communications identifiers until the system has determined as many entries in the first user's contact list associated with the second user's communications identifiers, as possible. FIG. 6A illustrates how a first user's (e.g., user 12345) contact list may include various entries associated with a second user (e.g., John Smith). FIG. 6B illustrates how different users' contact lists may include different entries, having different entry names, that are associated with a second user (e.g., John Smith).

Referring back to FIG. 5, the system generates (510) text data representing the entries in the first user's contact list that are associated with the second user's communications profile identifier. The text data may include a portion representing the entry names and/or entry contents of the associated entries (e.g., each entry's communications identifier) and a portion representing a request for the first user to indicate if the system should associate them in the first user's contact list.

The system may cause (514) the device 110 of the first user to display text corresponding to the text data. The system may also or alternatively perform (516) TTS processing on the text data to generate audio data (e.g., synthesized speech) and cause (518) the device 110 of the first user to output audio corresponding to the audio data.

The system receives (520) an input from the device 110. The input may be audio data corresponding to speech of the first user. The input may alternatively be an indicator representing user input in the form of a selection of a virtual button. For example, the device 110 may display virtual buttons to the first user that the first user can select to indicate the entries should or should not be associated in the first user's contact list. The input may alternatively be text data representing user input provided as a text input.

The system determines whether the input represents the entries should be associated in the first user's contact list. If the system determines the input represents the entries should not be associated in the first user's contact list, the system may repeat the processes of FIG. 5 with respect to entries in the first user's contact list that are associated with another user other than the second user. If the system determines (522) the input represents the entries should be associated in the first user's contact list, the system associates (524) the entries in the first user's contact list. Such association may include associating the contact identifiers of the various entries within the contact list while leaving the different entries in the contact list. Such association may alternatively include creating a new entry (associated with a new contact identifier) in the contact list that includes all of the communications identifiers of the different entries the first user indicated are to be associated. After creating the new entry, the system may leave the original different entries in the contact list or may delete the original different entries from the contact list.

After the system has associated the second user's entries in the first user's contact list, the system may perform the processes of FIG. 5 again with respect to third user's entries in the first user's contact list. The system may perform the processes of FIG. 5 with respect to the first user's contact list until the system is unable to determine different entries in the contact list that are associated with a same communications profile identifier of a different user. The system may perform the processes of FIG. 5 with respect to various users' contact lists.

Certain systems enable a user to block or set preferences for one communications modality of another user per each user input. For example, such a system may require the user indicate the exact communications modality or contact list entry to be blocked or that a preference should be set with respect to. Therefore, a foregoing system would not prevent the second user from bypassing the block or preference by using a communications modality that was not blocked or that did not have a preference associated therewith. The present disclosure enables a user to block or set preferences for multiple communications modalities of another user without needing to indicate more than one specific communications modalities. For example, according to the present disclosure, a user may block all known communications modalities of Joe Smith by simply saying "Alexa, block Joe Smith" or "Alexa, block Joe Smith's cell phone."

Figure 7:
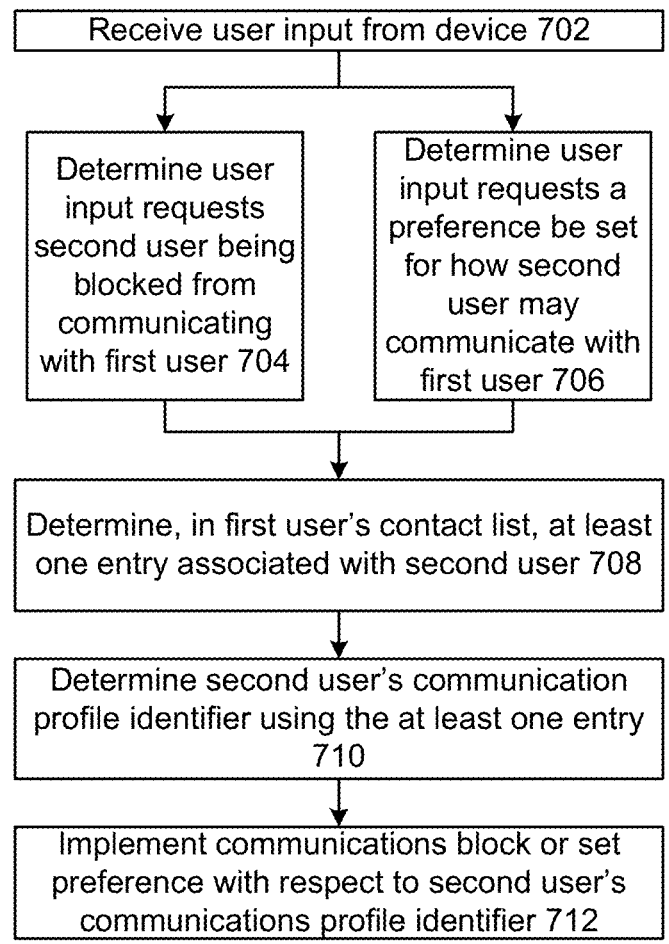
FIG. 7 is a process flow diagram illustrating the blocking of a user or the setting of preferences for a user according to embodiments of the present disclosure.

FIG. 7 illustrates how a first user may block a second user's communications identifier or set preferences for the second user's communications identifiers. The system receives (702) a user input from the first user's device 110. The user input may be audio data representing speech of the first user or may be text data representing a text input of the first user.

The system may determine (704) the user input represents a user command to block the second user from communicating with the first user. For example, the user input may correspond to "Alexa, block Joe Smith," with the first user intending the system to block communications identifiers represented in a "Joe Smith" contact in the first user's contact list. The system may alternatively determine (706) the user input represents a user command to set a preference with respect to how the second user may communicate with the first user. For example, the user input may correspond to "Alexa, do not let Joe Smith contact me after 7 pm," with the first user intending the system to prevent Joe Smith from contact the first user after 7 pm using communications identifiers associated with Joe Smith contact in the first user's contact list.

The system determines (708), in the first user's contact list, at least one entry associated with the second user. The system thereafter determines (710) the second user's communications profile identifier using the at least one entry. For example, the system may determine a communications identifier represented in the at least one entry and determine the second user's communications profile identifier associated with the communications identifier.

The system either implements (712) a communications block or sets a preference, depending on the user input, with respect to the second user's communications profile identifier. By implementing the block or setting the preference at the communications profile identifier level, the system effectively prevents the second user from contacting the first user using any of the second user's known communications modalities or limits the second user's ability to communicate with the first user regardless of the communications modality the second user invokes.

It will be appreciated that since a communications block or preference is set at the communications profile identifier level, the system may implement the block or preference with respect to communications modalities not known to the system at the time the block or preference is implemented. For example, after the system implements the block or preference, the second user may validate a further communications identifier with the system with respect to the second user's communications profile identifier. Since the block or preference is set with respect to the second user's communications profile identifier, the system may implement the block or preference with respect to the further communications identifier even though it was not known when the block or preference was initially set. For example, after the further communications identifier is validated, the second user may provide the system with an input to contact the first user using the further communications identifier. The system may determine the second user's communications profile identifier associated with the further communications identifier, determine the first user has caused the system to implement a block with respect to the second user's communication profile identifier, and may prevent the communication from being sent or established.

As stated throughout, a user's communications profile identifier may be associated with various communications identifiers through which the user may perform communications. A recipient of a communication may have a contact list including entries for one or some of the user's communications identifiers, but not all.

Figure 8:
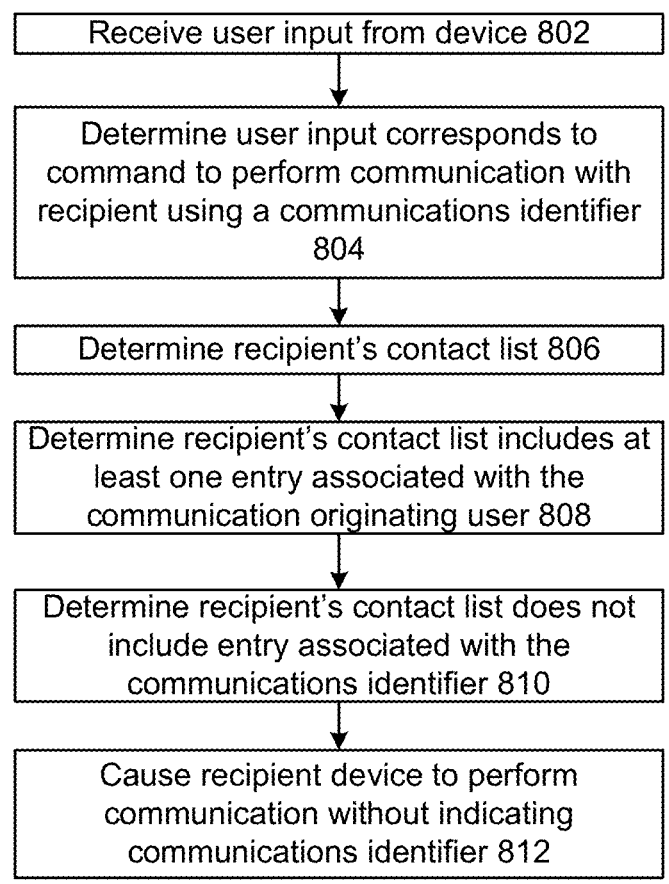
FIG. 8 is a process flow diagram illustrating the performance of a communication when the recipient of the communication does not have the communication originating modality in the recipient's contact list according to embodiments of the present disclosure.

FIG. 8 illustrates system processing performed when the user desires to perform a communication with a recipient but the recipient's contact list does not have an entry associated with the communications modality the user is using to communicate with the recipient. The system receives (802) a user input from a device 110. The user input may be audio data representing speech of a user or may be text data representing a text input of the user.

The system determines (804) the user input corresponds to a command to perform a communication with a recipient using a communications identifier. For example, performing the communication may correspond to establishing a two-way communication session between the user's device and a device of the recipient, or may correspond to the sending of a message to the recipient.

The system determines (806) the recipient's contact list. The system also determines (808) the recipient's contact list includes at least one entry associated with the communication originating user (e.g., including an entry including a communications identifier associated with the communication originating user's communications profile identifier) while also determining (810) the recipient's contact list does not include an entry including the communications identifier to be used to perform the communication. Since the recipient's contact list does not represent the to be used communications identifier, the system causes (812) a device of the recipient to perform a communication without indicating the communications identifier (of the communication originating user) being used. The system may instead cause the recipient's device to simply indicate the user originating the communication. For example, if the communication is a two-way communication, the system may cause the recipient device to output content (e.g., output audio and/or display text) representing the recipient is receiving a call from "Joe Smith" without indicating the call is being performed using Joe Smith's particular communications identifier. For further example, if the communication is the sending of a message, the system may cause the recipient device to output content (e.g., output audio and/or display text) representing the recipient is receiving the message from "Joe Smith" without indicating the message is being sent from Joe Smith's particular communications identifier. The foregoing enables a recipient to be contacted by known individuals (e.g., as demonstrated by the recipient's contact list including at least one entry associated with the individual) without the particular communications identifiers represented in the recipient's contact list being a hurdle. The foregoing also enables an individual to communicate with a known recipient (e.g., as demonstrated by the recipient's contact list including at least one entry associated with the individual) while also maintaining the communication originating individual's privacy (e.g., without divulging the communications identifier to the recipient).

The system may implement permissions and privacy blocks such that even if information from multiple users' contacts are aggregated into a system level communication profile, only information provided by a particular user is accessible by that user. For example, referring again to the example of FIGS. 6A and 6B, if user 12345 provided the information that John Smith's email address was john@ABCXYZ.com, but that email address was unknown to user 23456, even if user 23456 has a contact entry for John Smith, the system may not make John Smith's email address available to user 23456 (absent express permission from John Smith or other permissioning activity). Thus, even if John Smith's information across different modalities is known to the system, if user 23456 accesses her contact for "John Smith", it will not show the email address. Thus the system may track what information about a single person (e.g., John Smith) is independently known, or has been provided by, other users (e.g., user 12345, user 23456, etc.) so that the system may only provide a specific other user the information that other user already had about the single person.

Even if user 23456 may not know John Smith's email address, using the techniques herein, a message from user 23456 may be routed to John Smith's email address. For example, if user 23456 speaks a command to the system to send a message to John Smith, the system may access user 23456's contact list to determine a contact for John Smith and an identifier for John Smith in user 23456's contact. The system may then use that identifier to match user 23456's contact to the system level communication profile for John Smith. The system may determine, for example using preferences set by John Smith, that messages for John Smith should be routed to his email address. The system may then take the text (or audio, etc.) corresponding to the message spoken by user 23456 and route it to John Smith's email. Thus a message from user 23456 may be routed to John Smith's email address, even if user 23456 does not know John Smith's email address.

A first user may attempt to communicate with a second user using a first communications identifier of the second user. The second user's communications profile may include the first communications identifier as well as at least one other communications identifier.

Figure 9:
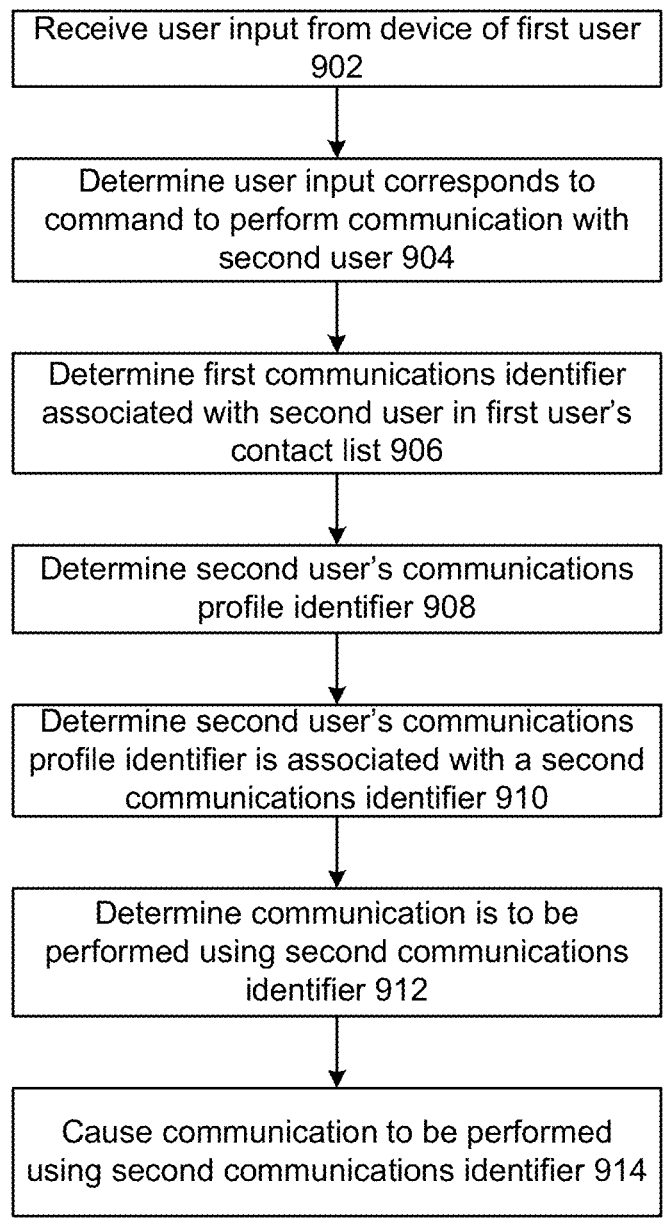
FIG. 9 is a process flow diagram illustrating the performance of a communication between a first user and a second user using a communications identifier of the second user different from that desired to be used by the first user according to embodiments of the present disclosure.

FIG. 9 illustrates how the system may perform a communication between a first user and a second user using a communications identifier of the second user different from that desired to be used by the first user. The processes performed with respect to FIG. 9 enable a first user to communicate with a second user using a modality best suited to perform the communication. The processing performed with respect to FIG. 9 also does not divulge the modality to the communication originating user so the fact that the communication recipient user uses the modality can be kept private. If the system maintains a log of the communication, the log may simply represent the contents of the communication without representing the communications identifier of the recipient user.

The system receives (902) a user input from a device of the first user. The user input may be audio data representing speech of the first user or text data representing a text input of the first user.

The system determines (904) the user input corresponds to a command to perform a communication with a second user. For example, performing the communication may correspond to establishing a two-way communication session between the first user's device and a device of the second user, or may correspond to the sending of a message to the second user.

The system determines (906) a first communications identifier associated with the second user in the first user's contact list. For example, the system may determine a communications profile identifier associated with the first user, determine a contact list associated with the first user's communications profile identifier, and determine the contact list includes an entry associated with the second user and including the first communications identifier.

The system determines (908) the second user's communications profile identifier associated with the first communications identifier. The system determines (910) the second user's communications profile identifier is associated with a second communications identifier. The second communications identifier may be missing from the first user's contact list.

The system determines (912) the communication is to be performed using the second communications identifier instead of the first communications identifier. For example, the system may determine such by determining the second user is presently logged in to a communications system associated with the second communications identifier.

Thereafter, the system causes (914) the communication to be performed using the second communications identifier. For example, the system may cause a message to be sent to the second user using a communications system associated with the second communications identifier. For further example, the system may cause a two-way communication session to be established between the first user and the second user using a communications system associated with the second communications identifier.

A first user's contact list may include one or more entries including some, but not all, of a second user's communications identifiers. This situation may occur in response to the second user validating a communications identifier with the system after the first user imported their contact list into the system. To ensure recipients have contact lists that are up-to-date, a user may provide the system with permission to notify individuals in the user's contact list when the user validates a new communications identifier with the system or when the user deletes a communications identifier from their communications profile (causing the communications identifier to no longer be associated with the user's communications profile identifier).

Figure 10:
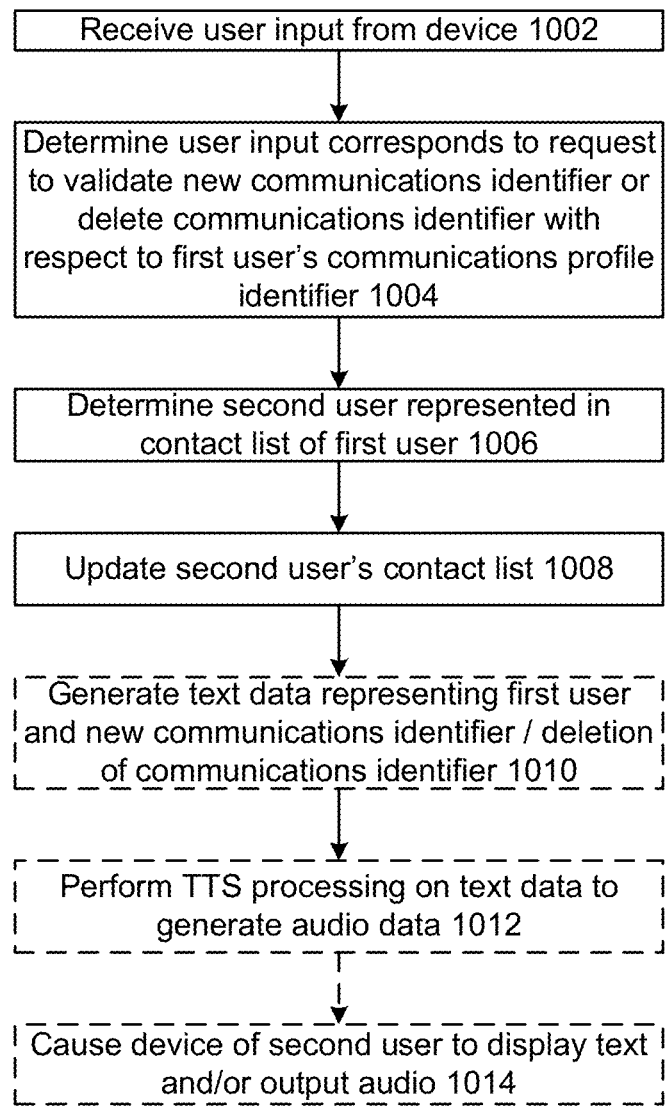
FIG. 10 is a process flow diagram illustrating the updating of a second user's contact list when a first user changes their communications profile according to embodiments of the present disclosure.

FIG. 10 illustrates how the system may update a second user's contact list when a first user changes their communications profile. The system receives (1002) a user input from a device 110 associated with a first user. The system determines (1004) the user input corresponds to a request to validate a new communications identifier or delete a communications identifier with respect to the first user's communications profile identifier. After the system validates the new communications identifier (and associates the new communications identifier with the first user's communications profile identifier) or deletes an old communications identifier (e.g., disassociates the old communications identifier from the first user's communications profile identifier), the system determines (1006) a second user represented in the first user's contact list and updates (1008) the second user's contact list. The system may be configured to only update a user's contact list if the user has provided the system with permission to do so. Updating a contact list may include creating a new contact (with an associated new contact identifier) and representing the newly validated communications identifier in the new contact (e.g., associating the newly validated communications identifier with the new contact identifier), adding the newly validated communications identifier to an existing contact associated with the first user (e.g., associating the newly validated communications identifier with an existing contact identifier), deleting an entry associated with the deleted communications identifier, or deleting the deleted communications identifier from a contact associated with the first user (e.g., disassociating the deleted communication identifier from the contact's contact identifier).

The system may be configured to indicate to the second user that their contact list has been updated. Such indication may be at the second user's direction (e.g., the first user's profile or communications profile may include a preference that the system notify the second user when the system updates the second user's contact list). The system may generate (1010) text data representing the first user and the new communications identifier or the deleted communications identifier. The system may also perform (1012) TTS processing on the text data to generate audio data (e.g., synthesized speech). The system may cause (1014) a device of the second user to display text corresponding to the text data and/or output audio corresponding to the audio data.

The system may perform steps 1006 through 1014 with respect to more than one user represented in the first user's contact list. After the system determines the user input corresponds to a request to validate a new communications identifier or delete a communications identifier with respect to the first user's communications profile, the system may determine users represented in the first user's contact list and provide the first user with a list (e.g., via a graphical user interface (GUI) or voice user interface (VUI)) of the users. The first user may provide the system with input representing selected users of the list and the system may perform steps 1008 through 1014 with respect to only the selected users. Such system configuration enables a user to have control over which users receive information regarding updates to the first user's communications modalities.

When a first user enables communications functionality of the system and creates a communications profile, the first user may import their contact list from a communications source (different from the system) to the system. The first user's contact list may include at least one entry for a second user of the system. The second user's communications profile identifier may be associated with multiple communications identifiers while the at least one entry in the first user's contact list may only represent a portion of the communications identifiers.

Figure 11:
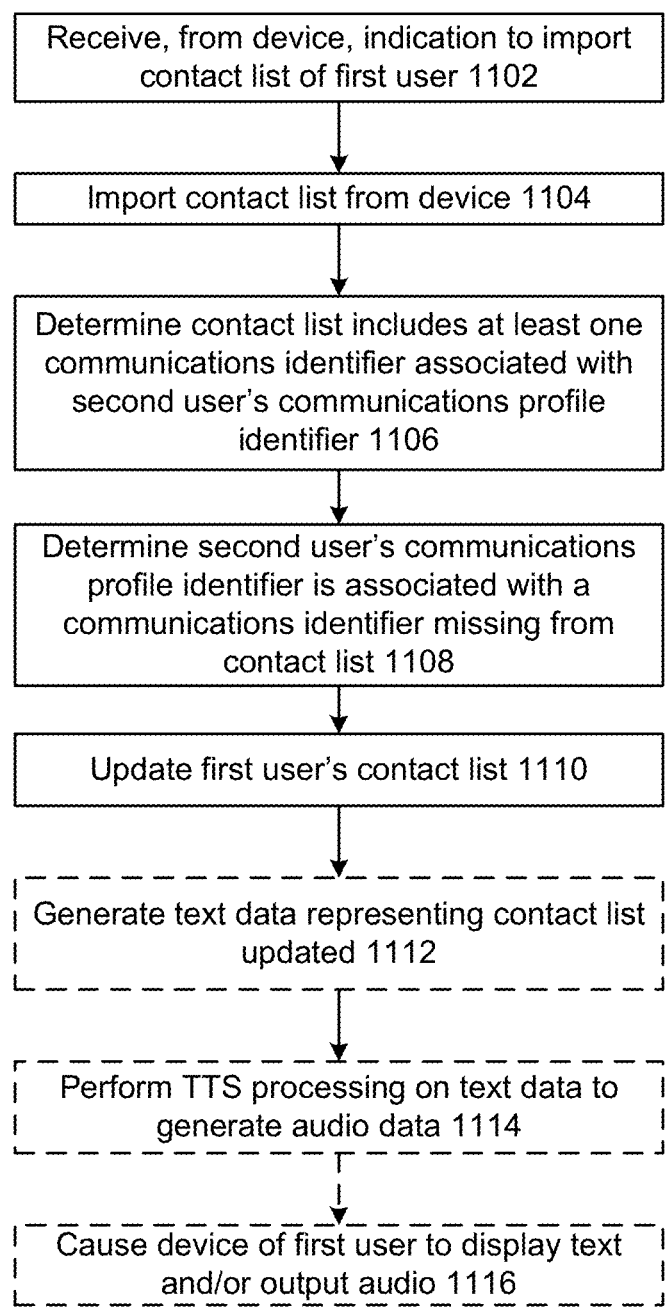
FIG. 11 is a process flow diagram illustrating the use of a second user's communications profile to update a newly imported contact list of a first user according to embodiments of the present disclosure.

FIG. 11 illustrates how the system may use a second user's communications profile to update a newly imported contact list of a first user. The system receives (1102), from a device of a first user, an indication to import a contact list. The indication may originate as speech of the first user, a text input of the first user, or the first user's selection of a virtual button. The system thereafter imports (1104) the contact list from the device.

The system determines (1106) the contact list includes at least one communications identifier associated with a second user's communications profile identifier. The system also determines (1108) the second user's communications profile identifier is associated with a communications identifier not represented in the first user's contact list.

The system updates (1110) the first user's contact list to include the missing communications identifier. Updating the contact list may include creating a new entry (associated with a new contact identifier) that represents the communications identifier or adding the communications identifier to an existing entry (e.g., associating the communications identifier with an existing contact identifier) associated with the second user. The system may be configured to update the first user's contact list only if the first user previously provided the system with permission to update their contact list.

The system may be configured to indicate to the first user that its contact list has been updated to include the missing communications identifier. Such indication may be at the first user's direction (e.g., the first user's profile or communications profile may include a preference that the system notify the first user when the system updates the first user's contact list). The system may generate (1112) text data representing the first user's contact list has been updated to include the missing communications identifier of the second user. The system may perform (1114) TTS processing on the text data to generate audio data (e.g., synthesized speech). The system may cause (1116) a device of the first user to display text corresponding to the text data and/or output audio corresponding to the audio data.

Instead of updating the first user's contact list prior to notifying the first user of the update, the system may be configured to notify the first user of the second user's communications identifier missing from the first user's contact list and update the first user's contact list if the first user indicates the system is to add the second user's missing communications identifier to the first user's contact list.

The system may be configured to perform the processes of FIG. 11 (e.g., update a first user's contact list with a second user's communications identifier) only if the second user has provided the system with permission to do so.

Figure 12:
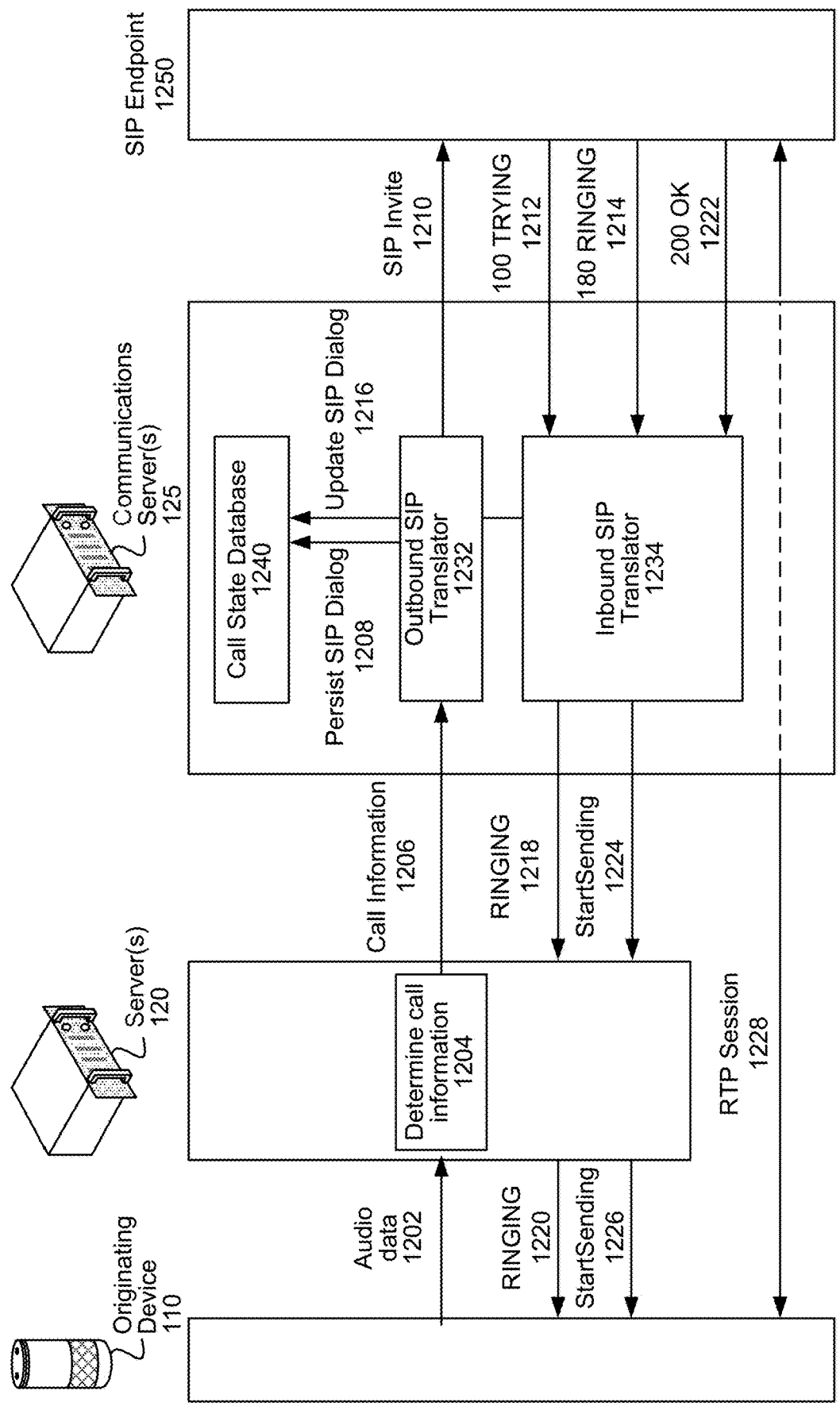
FIG. 12 illustrates an example of signaling to initiate a communication session according to embodiments of the present disclosure.

FIGS. 12-14B illustrate components that can be used to coordinate communications using a system such as that described herein. FIG. 12 illustrates an example of signaling to initiate a communication session according to the present disclosure. In one example, the server(s) 120 is configured to enable voice commands (e.g., perform ASR, NLU, etc. to identify a spoken command included in audio data), whereas the communications server(s) 125 is configured to enable communication sessions (e.g., using session initiation protocol (SIP)). For example, the communications server(s) 125 may send SIP messages to endpoints (e.g., recipient devices) in order to establish a communication session for sending and receiving audio data and/or video data. The communication session may use network protocols such as real-time transport protocol (RTP), RTP Control Protocol (RTCP), Web Real-Time communication (WebRTC), and/or the like. For example, the communications server(s) 125 may send SIP messages to initiate a single RTP media stream between two endpoints (e.g., direct RTP media stream between the originating device 110 and a recipient device) and/or to initiate and facilitate RTP media connections between the two endpoints (e.g., RTP media streams between the originating device 110 and the communications server(s) 125 and between the communications server(s) 125 and a recipient device). During a communication session, the communications server(s) 125 may initiate two media streams, with a first media stream corresponding to audio data sent from the originating device 110 and to the recipient device and a second media stream corresponding to audio data sent from the recipient device and to the originating device 110, although for ease of explanation this may be illustrated as a single RTP media stream.

As illustrated in FIG. 12, the originating device 110 may send (1202) the audio data 211 to the server(s) 120 and the server(s) 120 may determine (1204) call information using the audio data 211 and may send (1206) the call information to the communications server(s) 125 (e.g., via the communications speechlet 290a). The server(s) 120 may determine the call information by performing ASR, NLU, etc., as discussed herein, and the call information may include a data source name (DSN), a number from which to call, a number to which to call, encodings, and/or additional information. For example, the server(s) 120 may identify from which phone number the originating user would like to initiate the call, to which phone number the originating user would like to initiate the call, from which device 110 the originating user would like to perform the call, etc.

While FIG. 12 illustrates the server(s) 120 sending the call information to the communications server(s) 125 in a single step (e.g., 1206), the present disclosure is not limited thereto. Instead, the server(s) 120 may send the call information to the originating device 110 and the originating device 110 may send the call information to the communications server(s) 125 in order to initiate the call without departing from the present disclosure. Thus, the server(s) 120 may not communicate directly with the communications server(s) 125 in step 1206, or may instead instruct the originating device 110 to communicate with the communications server(s) 125 in order to initiate the call.

The communications server(s) 125 may include an outbound SIP translator 1232, an inbound SIP translator 1234, and a call state database 1240. The outbound SIP translator 1232 may include logic to convert commands received from the server(s) 120 into SIP requests/responses and may handle sending outgoing SIP requests and sending responses to incoming SIP requests. After receiving the call information, the outbound SIP translator 1232 may persist (1208) a SIP dialog using the call state database 1240. For example, the DSN may include information such as the name, location, and driver associated with the call state database 1240 (and, in some examples, a user identifier and password of the originating user) and the outbound SIP translator 1232 may send a SIP dialog to the call state database 1240 regarding the communication session. The call state database 1240 may persist the call state if provided a device identifier and one of a call identifier or a dialog identifier. The outbound SIP translator 1232 may send (1210) a SIP Invite to a SIP Endpoint 1250 (e.g., a recipient device, a Session Border Controller (SBC), or the like). While one SIP Endpoint 1250 is illustrated, one skilled in the art will appreciate that SIP invites may be sent to more than one SIP Endpoint 1250.

The outbound SIP translator 1232 may send the SIP Invite to a separate communications system, such as a cellular service provider. The cellular service provider may send the SIP invite to the SIP Endpoint 1250. It will thus be appreciated that a cellular service provider (or other communications modality provider) may act as an intermediary between the communications server(s) 125 and an SIP Endpoint 1250. Various APIs or other components may be used to exchange messages across different communication systems.

The inbound SIP translator 1234 may include logic to convert SIP requests/responses into commands to send to the server(s) 120 and may handle receiving incoming SIP requests and incoming SIP responses. The SIP endpoint 1250 may send (1212) a 100 TRYING message to the inbound SIP translator 1234 and may send (1214) a 180 RINGING message to the inbound SIP translator 1234. The inbound SIP translator 1234 may update (1216) the SIP dialog using the call state database 1240 and may send (1218) a RINGING message to the server(s) 120, which may send (1220) the RINGING message to the originating device 110. Alternatively, the inbound SIP translator 1234 may send the RINGING message to the originating device 110 without using the server(s) 120 as an intermediary.

When the communication session is accepted by the SIP endpoint 1250, the SIP endpoint 1250 may send (1222) a 200 OK message to the inbound SIP translator 1234, the inbound SIP translator 1245 may send (1224) a startSending message to the server(s) 120, and the server(s) 120 may send (1226) the startSending message to the originating device 110. Alternatively, the inbound SIP translator 1234 may send the startSending message to the originating device 110 without using the server(s) 120 as an intermediary. The startSending message may include information associated with an internet protocol (IP) address, a port, encoding, or the like required to initiate the communication session. Using the startSending message, the originating device 110 may establish (1228) an RTP communication session with the SIP endpoint 1250 via the communications server(s) 125. The RTP session may be referred to as direct audio communication functionality as speech captured by one device of the RTP session may be sent as audio data to another device of the RTP session, which outputs the speech to a recipient user.

For ease of explanation, the disclosure illustrates the system using SIP. However, the disclosure is not limited thereto and the system may use any communication protocol for signaling and/or controlling communication sessions without departing from the disclosure. Similarly, while some descriptions of the communication sessions refer only to audio data, the disclosure is not limited thereto and the communication sessions may include audio data, video data, and/or any other multimedia data without departing from the disclosure.

Figure 13A:
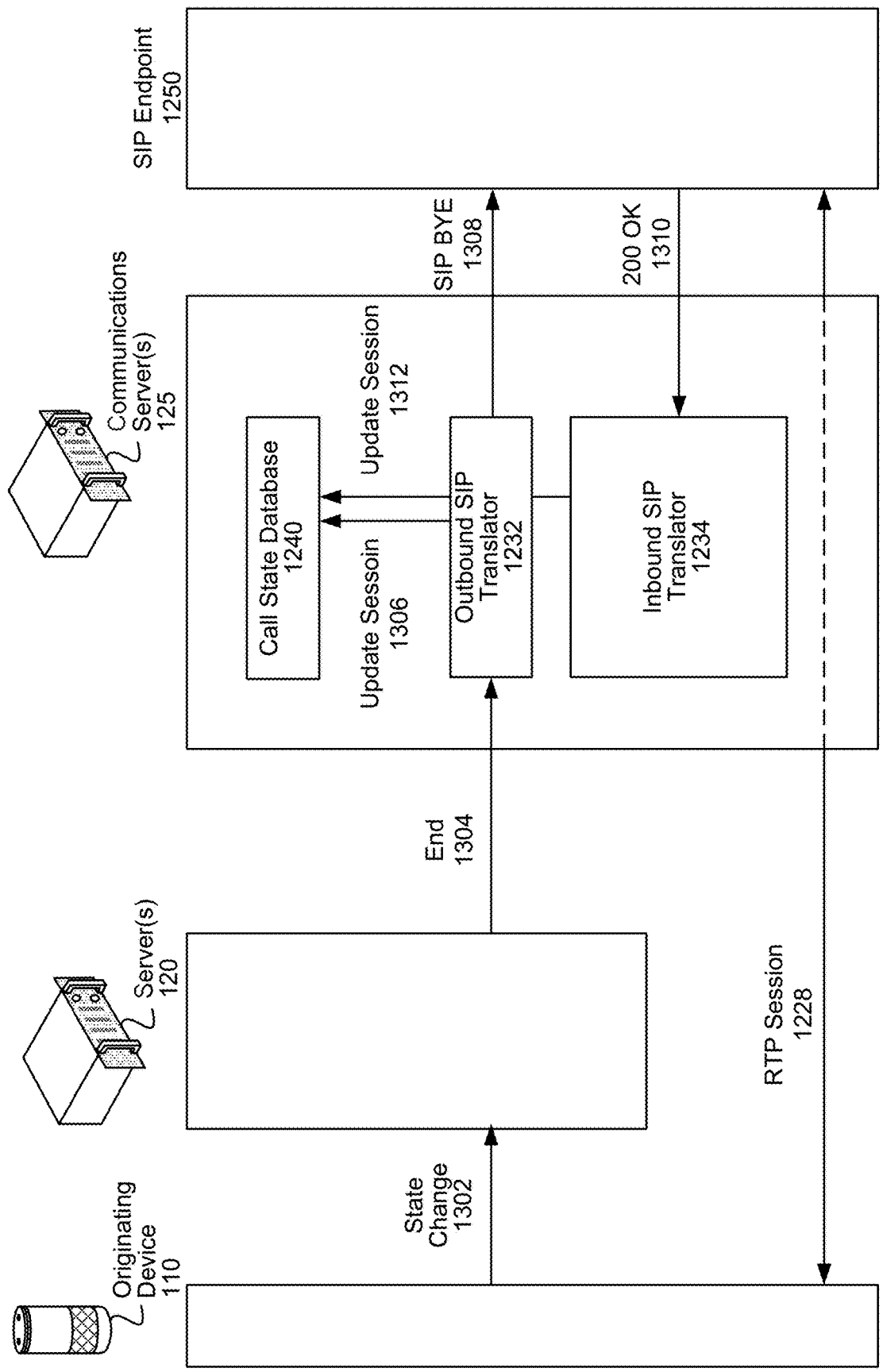
FIGS. 13A and 13B illustrate examples of signaling to end a communication session according to embodiments of the present disclosure.
Figure 13B:
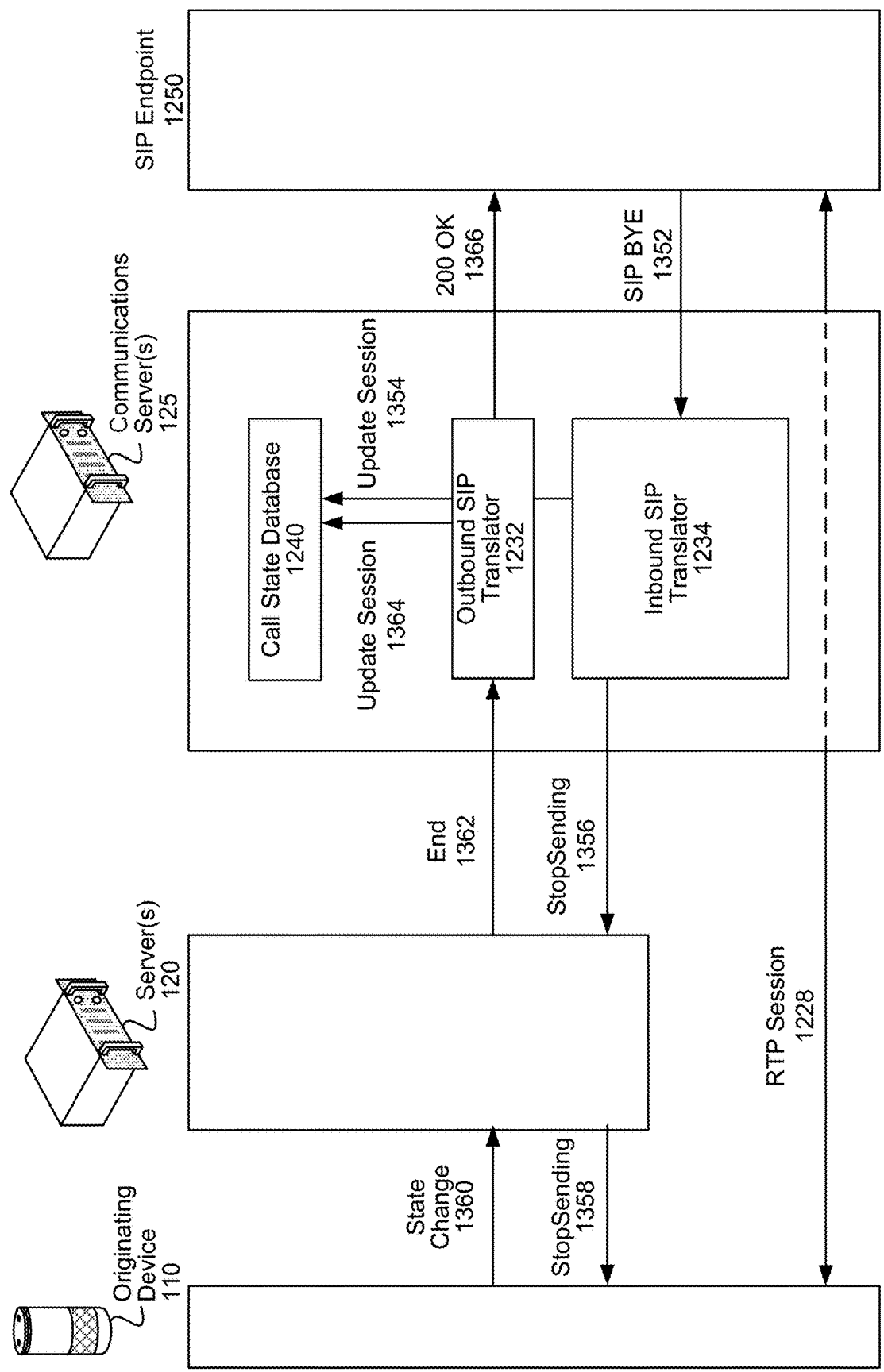

FIGS. 13A and 13B illustrate examples of signaling to end a communication session according to the present disclosure. After establishing the RTP communication session 1228 between the originating device 110 and the SIP endpoint 1250, the RTP communication session may be ended by the originating user inputting a command, to end the call, to the originating device 110, as illustrated in FIG. 13A, or a recipient user inputting a command, to end the call, to the SIP endpoint 1250, as illustrated in FIG. 13B.

As illustrated in FIG. 13A, the originating device 110 may send (1302) a state change message to the server(s) 120 and the server(s) 120 may send (1304) an end message to the communications server(s) 125. The outbound SIP translator 1232 may update (1306) the session using the call state database 1240 and may send (1308) a SIP BYE message to the SIP endpoint 1250. The SIP endpoint 750 may send (1310) a 200 OK message to the inbound SIP translator 1234 and the inbound SIP translator 1234 may update (1312) the session using the call state database 1240. In some examples, the inbound SIP translator 1234 may send the 200 OK message to the originating device 110 to confirm the communication session has been ended. Thus, the RTP communication session 1228 may be ended between the originating device 110 and the SIP endpoint 1250.

As illustrated in FIG. 13B, the SIP endpoint 1250 may send (1352) a SIP BYE message to the inbound SIP translator 1234 and the inbound SIP translator 1234 may update (1354) the session using the call state database 1240. The inbound SIP translator 1234 may send (1356) a stopSending message to the server(s) 120 and the server(s) 120 may send (1358) the stopSending message to the originating device 110. The originating device 110 may send (1360) a state change message to the server(s) 120 and the server(s) 120 may send (1362) an End message to the outbound SIP translator 1232, the End message including a DSN. The outbound SIP translator 1232 may then update (1364) the session using the call state database 1240, and send (1366) a 200 OK message to the SIP endpoint 1250. Thus, the RTP communication session 1228 may be ended between the originating device 110 and the SIP endpoint 1250.

While FIGS. 13A and 13B illustrate the server(s) 120 acting as an intermediary between the originating device 110 and the communications server(s) 125, the present disclosure is not limited thereto. Instead, steps 1302 and 1304 may be combined into a single step and the originating device 110 may send the state change message and/or the End message to the communications server(s) 125 without using the server(s) 120 as an intermediary. Similarly, steps 1366 and 1358 may be combined into a single step and the communications server(s) 125 may send the StopSending message to the originating device 110 without using the server(s) 120 as an intermediary, and/or steps 1360 and 1362 may be combined into a single step and the originating device 110 may send the state change message and/or the End message to the communications server(s) 125 without using the server(s) 120 as an intermediary.

While FIGS. 12, 13A, and 13B illustrate the RTP communication session 1228 being established between the originating device 110 and the SIP endpoint 1250, the present disclosure is not limited thereto and the RTP communication session 1228 may be established between the originating device 110 and a telephone network associated with the SIP endpoint 1250 without departing from the present disclosure.

Figure 14A:
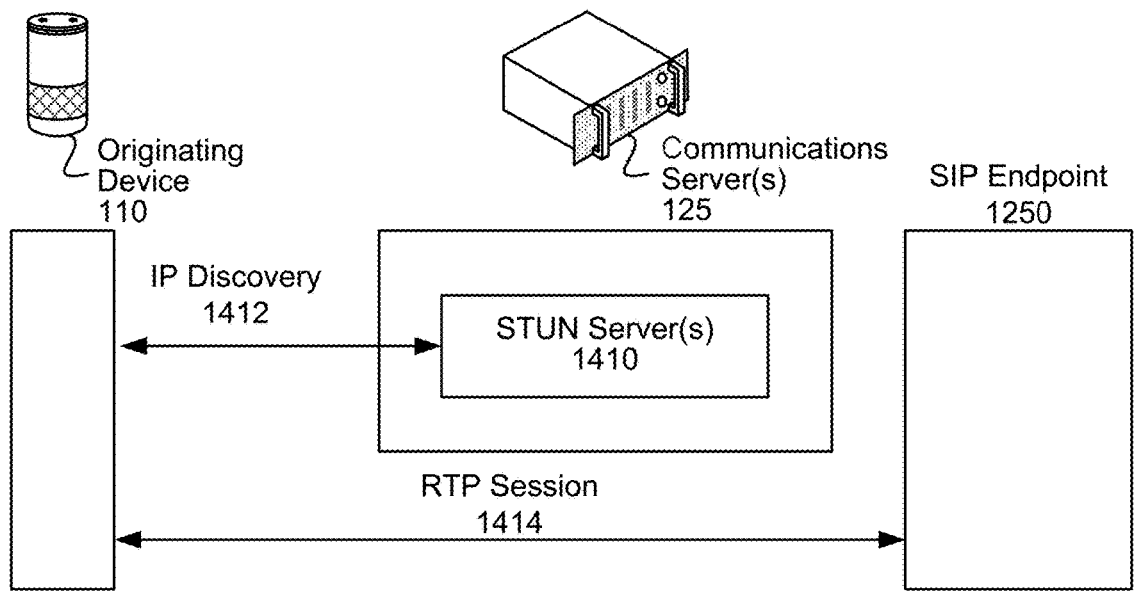
FIGS. 14A and 14B illustrate examples of establishing media connections between devices according to embodiments of the present disclosure.
Figure 14B:
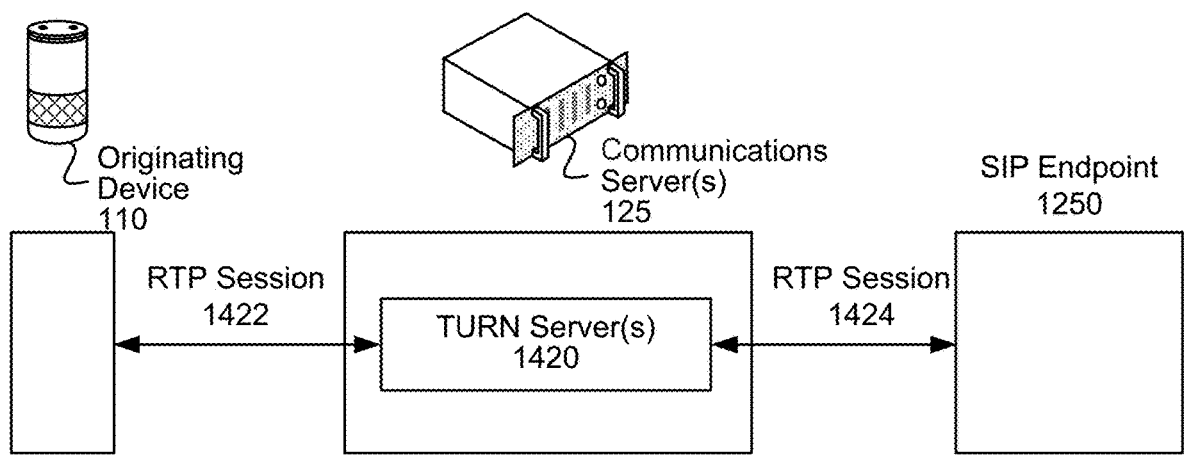

FIGS. 14A and 14B illustrate examples of establishing media connections between devices according to the present disclosure. In some examples, the originating device 110 may have a publicly accessible IP address and may be configured to establish the RTP communication session directly with the SIP endpoint 1250. To enable the originating device 110 to establish the RTP communication session, the communications server(s) 125 may include Session Traversal of User Datagram Protocol (UDP) Through Network Address Translators (NATs) server(s) (e.g., STUN server(s) 1410). The STUN server(s) 1410 may be configured to allow NAT clients (e.g., an originating device 110 behind a firewall) to setup calls to a VoIP provider hosted outside of the local network by providing a public IP address, the type of NAT they are behind, and a port identifier associated by the NAT with a particular local port. As illustrated in FIG. 14A, the originating device 110 may perform (1412) IP discovery using the STUN server(s) 1410 and may use this information to set up an RTP communication session 1414 (e.g., UDP communication) between the originating device 110 and the SIP endpoint 1250 to establish a call.

In some examples, the originating device 110 may not have a publicly accessible IP address. For example, in some types of NAT the originating device 110 cannot route outside of the local network. To enable the originating device 110 to establish an RTP communication session, the communications server(s) 125 may include Traversal Using relays around NAT (TURN) server(s) 1420. The TURN server(s) 1420 may be configured to connect the originating device 110 to the SIP endpoint 1250 when the originating device 110 is behind a NAT. As illustrated in FIG. 14B, the originating device 110 may establish (1422) an RTP session with the TURN server(s) 1420 and the TURN server(s) 1420 may establish (1424) an RTP session with the SIP endpoint 1250. Thus, the originating device 110 may communicate with the SIP endpoint 1250 via the TURN server(s) 1420. For example, the originating device 110 may send audio data to the communications server(s) 125 and the communications server(s) 125 may send the audio data to the SIP endpoint 1250. Similarly, the SIP endpoint 1250 may send audio data to the communications server(s) 125 and the communications server(s) 125 may send the audio data to the originating device 110.

In some examples, the system may establish communication sessions using a combination of the STUN server(s) 1410 and the TURN server(s) 1420. For example, a communication session may be more easily established/configured using the TURN server(s) 1420, but may benefit from latency improvements using the STUN server(s) 1410. Thus, the system may use the STUN server(s) 1410 when the communication session may be routed directly between two devices and may use the TURN server(s) 1420 for all other communication sessions. Additionally or alternatively, the system may use the STUN server(s) 1410 and/or the TURN server(s) 1420 selectively based on the communication session being established. For example, the system may use the STUN server(s) 1410 when establishing a communication session between two devices (e.g., point-to-point) within a single network (e.g., corporate LAN and/or WLAN), but may use the TURN server(s) 1420 when establishing a communication session between two devices on separate networks and/or three or more devices regardless of network(s). When the communication session goes from only two devices to three or more devices, the system may need to transition from the STUN server(s) 1410 to the TURN server(s) 1420. Thus, if the system anticipates three or more devices being included in the communication session, the communication session may be performed using the TURN server(s) 1420. When the communication session goes from three or more devices to only two devices, the system may need to transition from the TURN server(s) 1420 to the STUN server(s) 1410.

Figure 15:
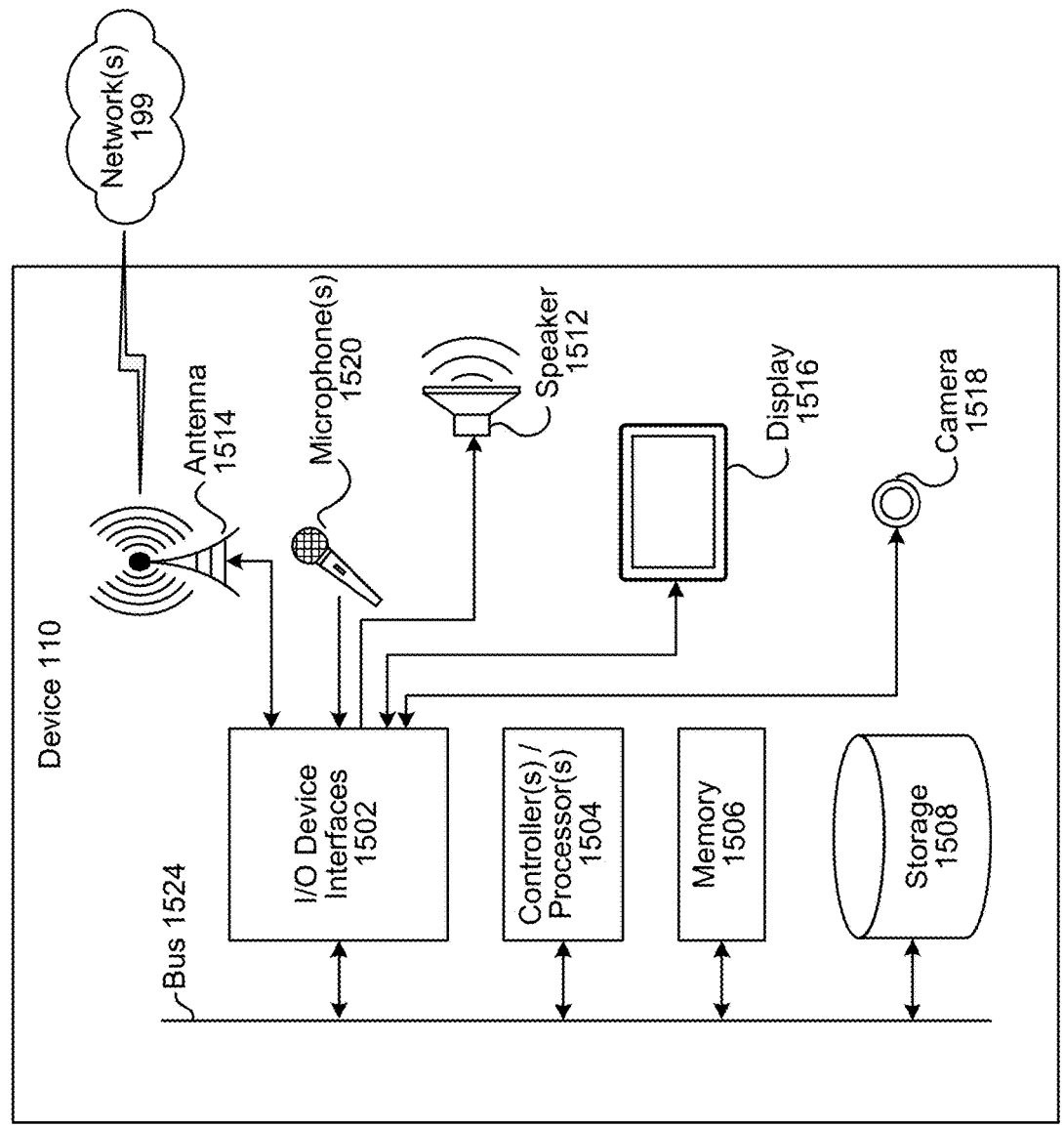
FIG. 15 is a block diagram conceptually illustrating example components of a device according to embodiments of the present disclosure.
Figure 16:
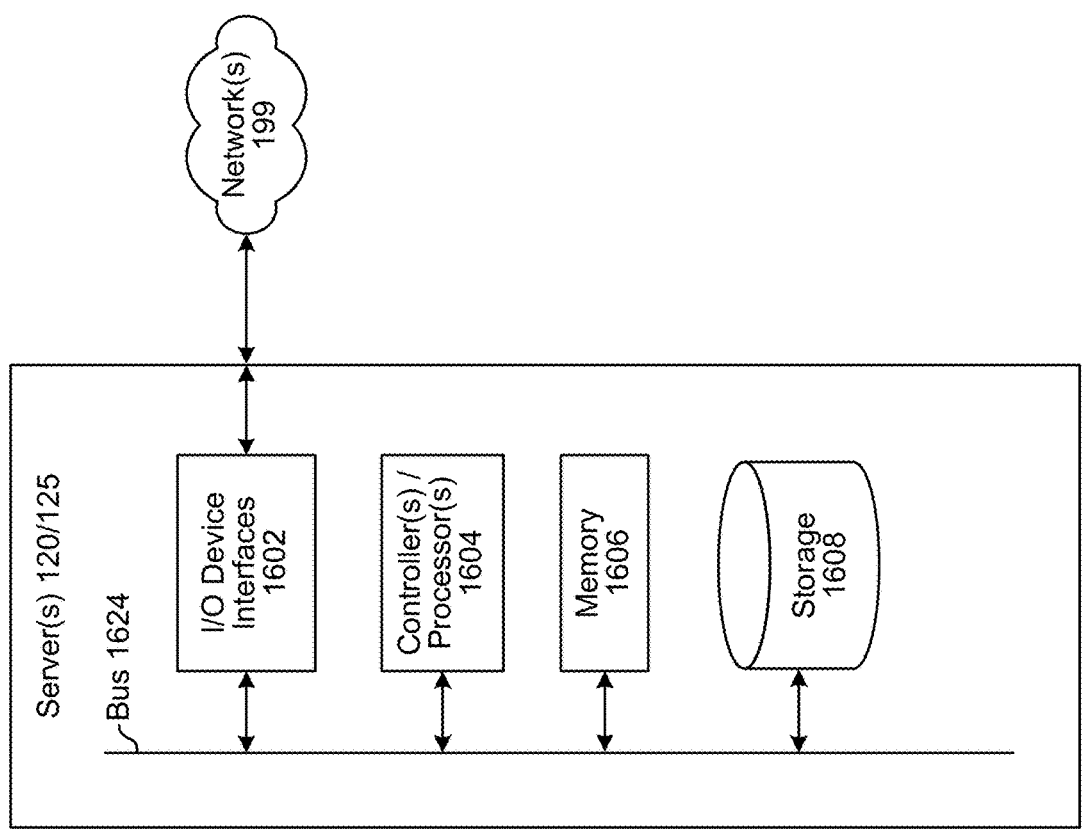
FIG. 16 is a block diagram conceptually illustrating example components of a server according to embodiments of the present disclosure.

FIG. 15 is a block diagram conceptually illustrating a device 110 that may be used with the system. FIG. 16 is a block diagram conceptually illustrating example components of a remote device, such as the server(s) 120, which may assist with ASR processing, NLU processing, etc. The term "server" as used herein may refer to a traditional server as understood in a server/client computing structure but may also refer to a number of different computing components that may assist with the operations discussed herein. For example, a server may include one or more physical components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers 120 may be included in the system, such as one or more servers 120 for performing ASR processing, one or more servers 120 for performing NLU processing, etc. In operation, each of these devices (or groups of devices) may include computer-readable and computer-executable instructions that reside on the respective device (110/120), as will be discussed further below.

Each of these devices (110/120/125) may include one or more controllers/processors (1504/1604), which may each include a central processing unit (CPU) for processing data and computer-readable instructions, and a memory (1506/1606) for storing data and instructions of the respective device. The memories (1506/1606) may individually include volatile random access memory (RAM), non-volatile read only memory (ROM), non-volatile magnetoresistive memory (MRAM), and/or other types of memory. Each device (110/120/125) may also include a data storage component (1508/1608) for storing data and controller/processor-executable instructions. Each data storage component (1508/1608) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1502/1602).

Computer instructions for operating each device (110/120/125) and its various components may be executed by the respective device's controller(s)/processor(s) (1504/1604), using the memory (1506/1606) as temporary "working" storage at runtime. A device's computer instructions may be stored in a non-transitory manner in non-volatile memory (1506/1606), storage (1508/1608), or an external device(s). Alternatively, some or all of the executable instructions may be embedded in hardware or firmware on the respective device in addition to or instead of software.

Each device (110/120/125) includes input/output device interfaces (1502/1602). A variety of components may be connected through the input/output device interfaces (1502/1602), as will be discussed further below. Additionally, each device (110/120/125) may include an address/data bus (1524/1624) for conveying data among components of the respective device. Each component within a device (110/120/125) may also be directly connected to other components in addition to (or instead of) being connected to other components across the bus (1524/1624).

Referring to FIG. 15, the device 110 may include input/output device interfaces 1502 that connect to a variety of components such as an audio output component such as a speaker 1512, a wired headset or a wireless headset (not illustrated), or other component capable of outputting audio. The device 110 may also include an audio capture component. The audio capture component may be, for example, a microphone 1520 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1516 for displaying content. The device 110 may further include a camera 1518.

Via antenna(s) 1514, the input/output device interfaces 1502 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1502/1602) may also include communication components that allow data to be exchanged between devices such as different physical servers in a collection of servers or other components.

The components of the device(s) 110, the server(s) 120, of the communications server(s) 125 may include their own dedicated processors, memory, and/or storage. Alternatively, one or more of the components of the device(s) 110, the server(s) 120, or the communications server(s) 125 may utilize the I/O interfaces (1502/1602), processor(s) (1504/1604), memory (1506/1606), and/or storage (1508/1608) of the device(s) 110 server(s) 120, or the communications server(s) 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the server(s) 120, and the communications server(s) 125, as described herein, are illustrative, and may be located as a stand-alone device or may be included, in whole or in part, as a component of a larger device or system.

Figure 17:
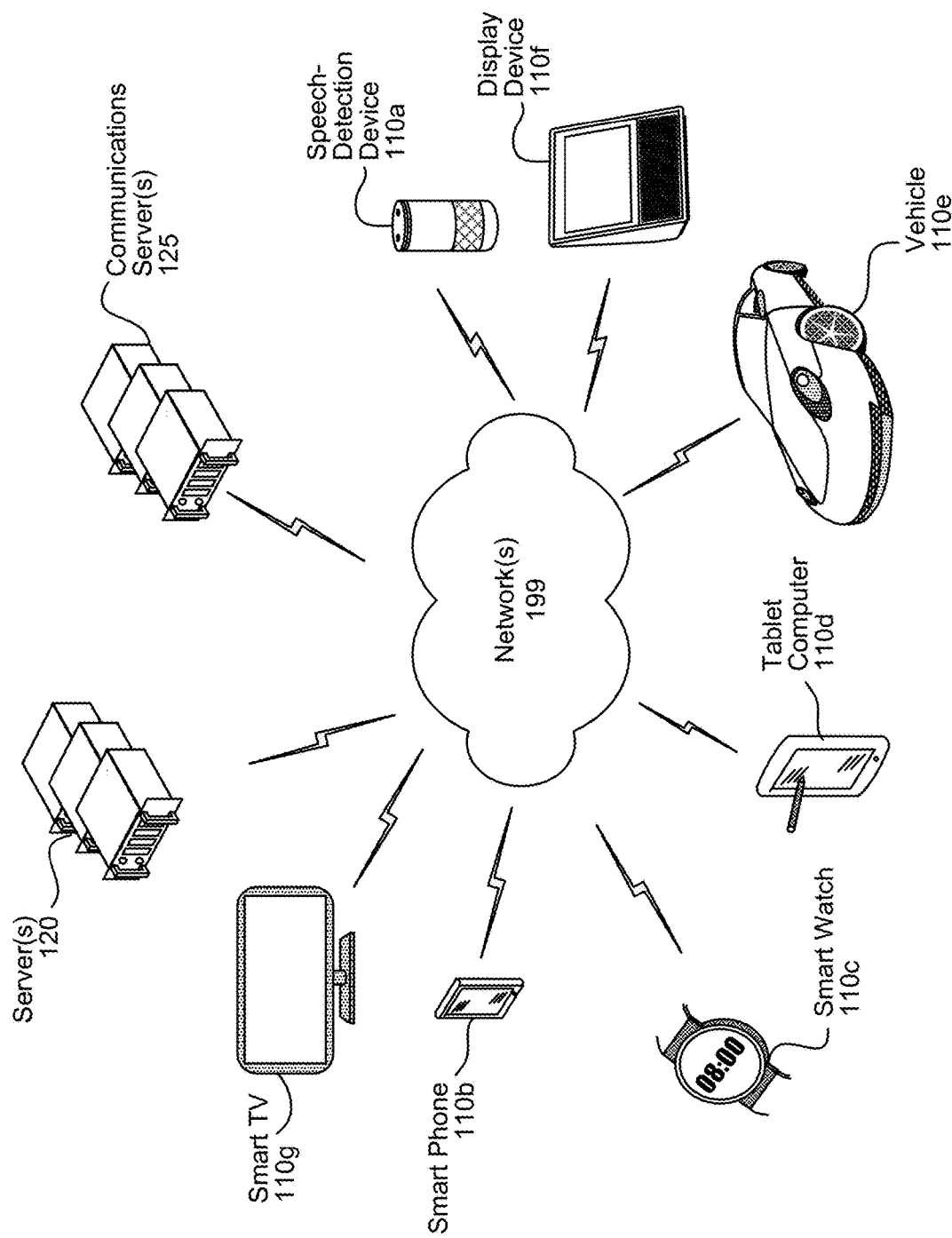
FIG. 17 illustrates an example of a network of devices according to embodiments of the present disclosure.

As illustrated in FIG. 17, multiple devices (110a-110g, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or a smart television 110g may be connected to the network(s) 199 through a wireless service provider, over a WiFi or cellular network connection, or the like. Other devices are included as network-connected support devices, such as the server(s) 120, the communications server(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
    receiving a first request indicating that communications from a first sender associated with a first communications identifier should be blocked with respect to at least one communications identifier of a first communications profile;
    determining at least one of the first sender and/or the first communications identifier corresponds to a second communications profile;
    determining first data indicating that communications from the second communications profile to the first communications profile are to be blocked;
    receiving a second request associated with a second communications identifier different from the first communications identifier, the second request corresponding to a requested communication to a recipient communications identifier associated with the first communications profile;
    determining the second communications identifier corresponds to the second communications profile; and based at least in part on the first data and the second communications identifier corresponding to the second communications profile, blocking the requested communication between the second communications identifier and the recipient communications identifier.

2. The computer-implemented method of claim 1, further comprising, after receiving the first request:
determining a third communications identifier is associated with the second communications profile; and
based at least in part on the first data and the third communications identifier corresponding to the second communications profile, determining second data indicating that communications associated with the third communications identifier to the first communications profile are to be blocked.

3. The computer-implemented method of claim 1, further comprising, prior to receiving the first request:
sending, to a device associated with the first communications profile, a message indicating a communication from the first sender, wherein the message does not identify the first communications identifier.

4. The computer-implemented method of claim 1, wherein the first request comprises a natural language request and wherein the method further comprises:
performing natural language processing using input data associated with the first request to determine a name corresponding to the first sender; and
determining the name corresponds to the second communications profile.

5. The computer-implemented method of claim 4, wherein determining the second communications identifier corresponds to the second communications profile comprises determining the second request corresponds to the name.

6. The computer-implemented method of claim 1, wherein:
the first request corresponds to an indication that communications from the first sender should be blocked with regard to a first communications modality; and
the requested communication corresponds to a second communications modality different from the first communications modality.

7. The computer-implemented method of claim 1, wherein:
one of the first communications identifier or the second communications identifier corresponds to a phone number; and
an other of the first communications identifier or the second communications identifier corresponds to an email address.

8. The computer-implemented method of claim 1, wherein:
one of the first communications identifier or the second communications identifier corresponds to a social media identifier; and
an other of the first communications identifier or the second communications identifier corresponds to a phone number.

9. The computer-implemented method of claim 1, wherein the first request is associated with a third communications identifier associated with the first communications profile, the third communications identifier being different from the recipient communications identifier.

10. The computer-implemented method of claim 9, wherein the third communications identifier being and the recipient communications identifier correspond to a same communications modality.

11. A system comprising:
at least one processor; and
at least one memory comprising instructions that, when executed by the at least one processor, cause the system to:
receive a first request indicating that communications from a first sender associated with a first communications identifier should be blocked with respect to at least one communications identifier of a first communications profile;
determine at least one of the first sender and/or the first communications identifier corresponds to a second communications profile;
determine first data indicating that communications from the second communications profile to the first communications profile are to be blocked;
receive a second request associated with a second communications identifier different from the first communications identifier, the second request corresponding to a requested communication to a recipient communications identifier associated with the first communications profile;
determine the second communications identifier corresponds to the second communications profile; and
based at least in part on the first data and the second communications identifier corresponding to the second communications profile, block the requested communication between the second communications identifier and the recipient communications identifier.

12. The system of claim 11, wherein the at least one memory further comprises instructions that, when executed by the at least one processor, further cause the system to, after receipt of the first request:
determine a third communications identifier is associated with the second communications profile; and
based at least in part on the first data and the third communications identifier corresponding to the second communications profile, determine second data indicating that communications associated with the third communications identifier to the first communications profile are to be blocked.

13. The system of claim 11, wherein the at least one memory further comprises instructions that, when executed by the at least one processor, further cause the system to, prior to receipt of the first request:
send, to a device associated with the first communications profile, a message indicating a communication from the first sender, wherein the message does not identify the first communications identifier.

14. The system of claim 11, wherein the first request comprises a natural language request and wherein the at least one memory further comprises instructions that, when executed by the at least one processor, further cause the system to:
perform natural language processing using input data associated with the first request to determine a name corresponding to the first sender; and
determine the name corresponds to the second communications profile.

15. The system of claim 14, wherein the instructions that cause the system to determine the second communications identifier corresponds to the second communications profile comprise instructions that, when executed by the at least one processor, cause the system to determine the second request corresponds to the name.

16. The system of claim 11, wherein:
the first request corresponds to an indication that communications from the first sender should be blocked with regard to a first communications modality; and
the requested communication corresponds to a second communications modality different from the first communications modality.

17. The system of claim 11, wherein:
one of the first communications identifier or the second communications identifier corresponds to a phone number; and
an other of the first communications identifier or the second communications identifier corresponds to an email address.

18. The system of claim 11, wherein:
one of the first communications identifier or the second communications identifier corresponds to a social media identifier; and
an other of the first communications identifier or the second communications identifier corresponds to a phone number.

19. The system of claim 11, wherein the first request is associated with a third communications identifier associated with the first communications profile, the third communications identifier being different from the recipient communications identifier.

20. The system of claim 19, wherein the third communications identifier being and the recipient communications identifier correspond to a same communications modality.

\* \* \* \* \*